United States Patent
Baba et al.

(10) Patent No.: US 8,124,668 B2
(45) Date of Patent: Feb. 28, 2012

(54) SILICONE-CONTAINING OCULAR LENS MATERIAL WITH HIGH SAFETY AND PREPARING METHOD THEREOF

(75) Inventors: Masaki Baba, Kasugai (JP); Tsuyoshi Watanabe, Kasugai (JP)

(73) Assignee: Menicon Co., Ltd., Nagoya-Shi (JP)

( * ) Notice: Subject to any disclaimer, the term of this patent is extended or adjusted under 35 U.S.C. 154(b) by 591 days.

(21) Appl. No.: 10/541,746

(22) PCT Filed: Jan. 8, 2004

(86) PCT No.: PCT/JP2004/000071
§ 371 (c)(1),
(2), (4) Date: Jul. 8, 2005

(87) PCT Pub. No.: WO2004/063795
PCT Pub. Date: Jul. 29, 2004

(65) Prior Publication Data
US 2006/0142410 A1 Jun. 29, 2006

(30) Foreign Application Priority Data
Jan. 10, 2003 (JP) ................................ 2003-004951

(51) Int. Cl.
| | | |
|---|---|---|
| G02B 1/04 | (2006.01) | |
| C08F 290/04 | (2006.01) | |
| C08F 30/08 | (2006.01) | |
| C08F 283/12 | (2006.01) | |
| G02C 7/04 | (2006.01) | |
| B28B 1/14 | (2006.01) | |
| C08J 3/28 | (2006.01) | |

(52) U.S. Cl. ................... 523/106; 523/107; 351/160 H; 351/160 R; 264/299; 528/499; 526/279; 522/90; 522/99; 522/148; 522/172

(58) Field of Classification Search ............... 523/106, 523/107, 108; 524/264, 258; 351/160 H, 351/160 R; 264/299; 528/499; 526/279; 522/90, 99, 148, 172
See application file for complete search history.

(56) References Cited

U.S. PATENT DOCUMENTS

| | | | | |
|---|---|---|---|---|
| 4,547,543 A | * | 10/1985 | Shibata et al. | .............. 524/264 |
| 5,516,467 A | * | 5/1996 | Niwa et al. | ................... 264/1.1 |
| 5,556,929 A | | 9/1996 | Yokoyama et al. | |
| 6,200,626 B1 | * | 3/2001 | Grobe et al. | ................. 427/2.24 |
| 6,379,004 B1 | * | 4/2002 | Walther et al. | ................ 351/166 |
| 6,503,632 B1 | * | 1/2003 | Hayashi et al. | ............... 428/447 |
| 2001/0050749 A1 | * | 12/2001 | Watanabe | .................. 351/160 H |
| 2002/0016383 A1 | * | 2/2002 | Iwata et al. | .................... 523/106 |
| 2002/0102415 A1 | * | 8/2002 | Valint et al. | .................... 428/447 |
| 2002/0137811 A1 | * | 9/2002 | Turek et al. | .................... 523/106 |
| 2003/0125500 A1 | | 7/2003 | Watanabe et al. | ............... 528/54 |
| 2003/0171522 A1 | * | 9/2003 | Brandenburg | ................ 526/305 |
| 2004/0014898 A1 | * | 1/2004 | Ichihara | ........................ 525/283 |

FOREIGN PATENT DOCUMENTS

| | | |
|---|---|---|
| EP | 0 657 751 A2 | 6/1995 |
| EP | 1 136 521 A2 | 9/2001 |
| EP | 1 197 782 A1 | 4/2002 |
| JP | 57-34518 | 2/1982 |
| JP | 06214197 A * | 8/1994 |
| JP | 7-191286 | 7/1995 |
| JP | 10-319207 | 12/1998 |
| JP | 11-326849 | 11/1999 |
| WO | WO 0171415 A1 * | 9/2001 |

OTHER PUBLICATIONS

Iskander et al. Synthesis and properties of poly( 1-alkyl-3-methylene-2-pyrrolidone)s, Macromol. Chem. Phys. 1996, 197,3123-3133. Huthig & Wepf Verlag, Zug.*
English machine translation of JP 06214197 A.*
European Search Report dated Apr. 18, 2006.

* cited by examiner

*Primary Examiner* — Michael Pepitone
(74) *Attorney, Agent, or Firm* — Kratz, Quintos & Hanson, LLP

(57) ABSTRACT

[Problem] To provide a safe ocular lens material having high oxygen permeability, excellent surface wettability, the excellent lubricity/easy lubricating property of surface, little in surface adhesive and superior flexibility and stress relaxation, in addition, suppressing elution of a monomer from the final product.

[Means for Solving the Problem] An ocular lens comprising a compound (A) having an ethylenically unsaturated group and polydimethylsiloxane structure through a urethane bond and an 1-alkyl-3-methylene-2-pyrrolidone (B).

[Selected Figure] None

28 Claims, No Drawings

SILICONE-CONTAINING OCULAR LENS MATERIAL WITH HIGH SAFETY AND PREPARING METHOD THEREOF

TECHNICAL FIELD

The present invention relates to an ocular lens material and a preparing method thereof. More specifically, the present invention relates to an ocular lens material excellent in surface wettability and the lubricity/easy lubricating property of surface in addition to high oxygen permeability and flexibility which can be preferably used as a contact lens, an intraocular lens, an artificial cornea, cornea onlay, cornea inlay and the like, and a preparing method thereof.

BACKGROUND ART

1-Vinyl-2-pyrrolidone (hereinafter, referred to as N-VP) is used for preparing industrially useful and typically water-soluble polymer. However, it has a defect that copolymerizability with an alkyl (meth)acrylate and an alkyl (meth)acrylamide which are industrially and frequently used is low because of having a vinyl group. Consequently, when the polymerization of a material using N-VP, in particular, UV polymerization for curing in a short time is carried out, an unreacted monomer tends to be increased.

It is described in JP-A-58-152017 that in order to improve polymerizability and prepare a water-soluble polymer useful for various industries, 1-methyl-3-methylene-2-pyrrolidone (hereinafter, referred to as 1,3-MMP) having a pyrrolidone structure is used. Also, a water-containing contact lens material comprising 1,3-MMP as a main component is described in JP-B-1-15847 and JP-B-6-82177. 1,3-MMP has an amide group adjacent to a methylene group and is a compound having a similar structure as an alkyl (meth)acrylamide which is frequently used in the technical field to which the present invention belongs. Accordingly, 1,3-MMP has good solubility with the alkyl (meth)acrylamide and alkyl (meth)acrylate and is superior in copolymerizability. For example, in JP-B-6-82177, a hydrogel with high water content having a water content of 70% by weight or more in which 1,3-MMP and N-VP was copolymerized is described. It is described in these references that a hydrogel superior in flexibility is obtained by using 1,3-MMP as a main component. However, although the hydrogel with high water content is superior in flexibility, only a contact lens inferior to keep its shape is prepared. In addition, the oxygen permeability of the contact lens comprising gels with high water content which are described in these patent references is greatly lower than the oxygen permeability of water, it cannot be said that it can permeate oxygen necessary for the cornea considering the wearing state at continuous wearing or at short sleep.

On the other hand, many silicone hydrogel materials which used a hydrophobic silicone compound as a main component have been recently reported in order to improve oxygen permeability of a lens to the cornea. Further, since silicone compounds are used, the wettability of material surface is poor, and it is described in U.S. Pat. No. 5,486,579 specification in order to improve the wettability that N-VP which is a strongly hydrophilic monomer is copolymerized. However, as described above, since N-VP is low in copolymerizability with (meth)acrylate, there is high possibility that N-VP remains as an unreacted monomer in a product material when the copolymer is used as a medical device. Further, many works are required for providing a safe medical device having no residue. Consequently, in order to improve the problem, the structure of a monomer for unionizing the polymerizable group of other polymerizable components is designed in U.S. Pat. No. 5,486,579 specification for improving copolymerizability with N-VP. However, it is required to carry out the monomer design and production of all polymerizable components for using components having various functions. This is very difficult in any traders.

Further, a contact lens comprising 1,3-MMP and a silicone-containing (meth)acrylate and/or a fluoroalkyl (meth)acrylate is described in JP-A-6-214197. In the patent, the copolymerization of the silicone-containing (meth)acrylate and/or a fluoroalkyl (meth)acrylate which is used for an oxygen permeating contact lens material is described in order to improve rigidity to keep its shape and mechanical strength. However, the contact lens material being a target has a water content of about 37 to 58% and an oxygen permeation coefficient of about 26 to 35 and it cannot be said that it has adequate oxygen permeability considering the wearing state at continuous wearing or at short sleep. Further, the copolymer of the silicone-containing (meth)acrylate and/or a fluoroalkyl (meth)acrylate and a hydrophilic monomer as a main component described in JP-A-6-214197 is insufficient in the shape stability and mechanical strength.

The solubility of components composing the material is important in production of a hydrogel containing silicone. Since a material comprising a silicone-containing monomer and a strongly hydrophilic monomer tends to cause phase separation in the material, it is difficult to obtain a transparent material. An organic solvent is often used in polymerization in such a system poor in solubility. For example, a preparing method of a contact lens using 5 to 60% by weight of an organic solvent is shown in Japanese Patent No. 3249123 and a method of evaporating the solvent at a specific temperature to remove it is shown in the fore-mentioned preparing method of Japanese Patent Application National Publication (Laid-Open) No. 8-503173. However, the amount of the organic solvent used is much as several tens % in these references and when an adequate amount of organic solvent is used for obtaining a transparent material, the degree of polymerization tends to be low because of radical chain transfer to the organic solvent; therefore the lowering of the strength of a material itself cannot be evaded. Further, for the same reason, the elution amount of a monomer and an oligomer from a material is much. Further, it is troublesome and difficult to remove a large amount of the organic solvent from the system and the method is not suitable considering mass production.

The present invention was achieved considering the fore-mentioned conventional techniques and it is the purpose of the present invention to provide an ocular lens material excellent in oxygen permeability, surface wettability and the lubricity/easy lubricating property of surface, little in surface adhesive and having superior flexibility and repulsive property, and a preparing method thereof. Further, it is the purpose of the present invention to provide a safe ocular lens material by improving low polymerizability which is observed in a system using N-VP as a hydrophilic component, establishing a system in which a residual component can be reduced in production of a lens, and suppressing a monomer eluted product from the final product.

DISCLOSURE OF INVENTION

As a result of extensively studying to obtain the ocular lens material having the fore-mentioned properties, the present inventors have found that the ocular lens material in which a compound having ethylenically unsaturated groups and polydimethylsiloxane structures through a specific urethane bond and a pyrrolidone derivative represented by 1,3-MMP in which a polymerizable group is a methylene group, for example, 1-alkyl-3-methylene-2-pyrrolidone, 1-alkyl-5-methylene-2-pyrrolidone, and 5-alkyl-3-methylene-2-pyrrolidone are essential components has the fore-mentioned properties in combination and have completed the present invention.

Namely, the present invention relates to an ocular lens material containing (A) at least one kind of a compound having ethylenically unsaturated groups and polydimethylsiloxane structures through a urethane bond and (B) at least one kind of a pyrrolidone derivative in which a polymerizable group is a methylene group.

Further, the present invention relates to a method for preparing an ocular lens material, comprising a) a step of obtaining a mixed solution comprising at least one kind of a compound (A) having ethylenically unsaturated groups and polydimethylsiloxane structure through a urethane bond and a hydrophilic monomer (B) comprising at least one kind of a pyrrolidone derivative in which a polymerizable group is a methylene group and an photo polymerization initiator and/or a thermal polymerization initiator, b) a step of introducing said mixed solution to a mold for molding, c) a step of obtaining an ocular lens material cured by irradiating UV light on and/or heating the mixed solution in said mold for molding, d) a step of carrying out surface treatment to said ocular lens material after demolding said ocular lens material to impart hydrophilicity and deposit resistance, e) a step of removing an unreacted component from said ocular lens material, and f) a step of hydrating said ocular lens material.

BEST MODE FOR CARRYING OUT THE INVENTION

The ocular lens material of the present invention comprises at least one kind of a compound (A) having an ethylenically unsaturated group and polydimethylsiloxane structure through a urethane bond and at least one kind of a pyrrolidone derivative (B) in which a polymerizable group is a methylene group.

The compound (A) has a bond being an elastic urethane bond and is a component reinforcing without spoiling flexibility and oxygen permeability of the material by the siloxane segment, imparting stress relaxation to remove brittleness and improving mechanical strength. Further, since the compound (A) has silicone chains in its molecular chain, it can impart high oxygen permeability to a product.

Since the compound (A) has ethylenically unsaturated groups being a polymerizable group at each terminal of the molecule, and is copolymerized with other copolymerization component through the polymerizable group, it has excellent characteristics of imparting to the obtained ocular lens material not only physical reinforcing effect by intertwisting of molecule but also reinforcing effect by chemical bond (covalent bond). Namely, the compound (A) acts as a high molecular weight crosslinkable monomer.

The compound (A) is a polysiloxane macromonomer in which the polymerizable groups represented by the general formula (1):

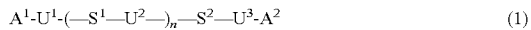

$A^1-U^1-(-S^1-U^2-)_n-S^2-U^3-A^2$ (1)

[Wherein $A^1$ is a group represented by the general formula (2):

$Y^{21}-Z^{21}-R^{31}-$ (2)

(Wherein $Y^{21}$ indicates a (meth)acryloyl group, a vinyl group or an allyl group, $Z^{21}$ indicates an oxygen atom or a direct bond, and $R^{31}$ indicates a direct bond or an alkylene group having a linear chain, a branched chain or an aromatic ring having 1 to 12 carbons);

$A^2$ is a group represented by the general formula (3):

$-R^{34}-Z^{22}-Y^{22}$ (3)

(Wherein $Y^{22}$ indicates a (meth)acryloyl group, a vinyl group or an allyl group, $Z^{22}$ indicates an oxygen atom or a direct bond, and $R^{34}$ indicates a direct bond or an alkylene group having a linear chain, a branched chain or an aromatic ring having 1 to 12 carbons) (Provided that $Y^{21}$ in the general formula (2) and $Y^{22}$ in the general formula (3) may be the same or different);

$U^1$ is a group represented by the general formula (4):

$-X^{21}-E^{21}-X^{25}-R^{32}-$ (4)

(Wherein each of $X^{21}$ and $X^{25}$ is independently selected from a direct bond, an oxygen atom and an alkylene glycol group, $E^{21}$ is a —NHCO— group (Provided that in this case, $X^{21}$ is a direct bond, $X^{25}$ is an oxygen atom or an alkylene glycol group, and $E^{21}$ forms a urethane bond with $X^{25}$), a —CONH— group (Provided that in this case, $X^{21}$ is an oxygen atom or an alkylene glycol group, $X^{25}$ is a direct bond, and $E^{21}$ forms a urethane bond with $X^{21}$), or a divalent group derived from diisocyanate selected from the group consisting of a saturated or unsaturated aliphatic group, an alicyclic group and an aromatic group (Provided that in this case, each of $X^{21}$ and $X^{25}$ is independently selected from an oxygen atom and an alkylene glycol group, and $E^{21}$ forms two urethane bonds with $X^{21}$ and $X^{25}$), $R^{32}$ indicates an alkylene group having a linear chain or a branched chain having 1 to 6 carbons);

each of $S^1$ and $S^2$ is independently a group represented by the general formula (5):

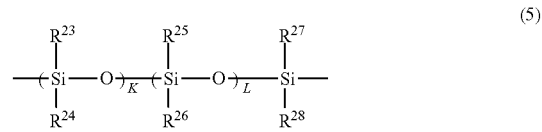

(5)

(Wherein each of $R^{23}$, $R^{24}$, $R^{25}$, $R^{26}$, $R^{27}$ and $R^{28}$ is independently an alkyl group having 1 to 6 carbons, an alkyl group substituted with fluorine or a phenyl group, k is an integer of 10 to 100, L is 0 or an integer of 1 to 90, and K+L is an integer of 10 to 100);

$U^2$ is a group represented by the general formula (6):

$-R^{37}-X^{27}-E^{24}-X^{28}-R^{38}-$ (6)

(Wherein each of $R^{37}$ and $R^{38}$ is independently an alkylene group having a linear chain or a branched chain having 1 to 6 carbons; each of $X^{27}$ and $X^{28}$ is independently an oxygen atom or an alkylene glycol group; $E^{24}$ is a divalent group derived from diisocyanate selected from the group consisting of a saturated or unsaturated aliphatic group, an alicyclic group and an aromatic group (Provided that in this case, $E^{24}$ forms two urethane bonds with $X^{27}$ and $X^{28}$);

$U^3$ is a group represented by the general formula (7):

$$-R^{33}-X^{26}-E^{22}-X^{22}- \quad (7)$$

(Wherein $R^{33}$ indicates an alkylene group having a linear chain or a branched chain having 1 to 6 carbons, each of $X^{22}$ and $X^{26}$ is independently selected from a direct bond, an oxygen atom and an alkylene glycol group, $E^{22}$ is a —NHCO— group (Provided that in this case, $X^{22}$ is an oxygen atom or an alkylene glycol group, $X^{26}$ is a direct bond, and $E^{22}$ forms a urethane bond with $X^{22}$), a —CONH— group (Provided that in this case, $X^{22}$ is a direct bond, $X^{26}$ is an oxygen atom or an alkylene glycol group, and $E^{22}$ forms a urethane bond with $X^{26}$), or a divalent group derived from diisocyanate selected from the group consisting of a saturated or unsaturated aliphatic group, an alicyclic group and an aromatic group (Provided that in this case, each of $X^{22}$ and $X^{26}$ is independently selected from an oxygen atom and an alkylene glycol group, and $E^{22}$ forms two urethane bonds with $X^{22}$ and $X^{26}$);
n indicates 0 or an integer of 1 to 10],
are bound with a siloxane main chain through at least one of urethane bonds In the general formula (1), $A^1$ is a group represented by the general formula (2) as described above:

$$Y^{21}-Z^{21}-R^{31}- \quad (2)$$

(Wherein $Y^{21}$, $Z^{21}$ and $R^{31}$ are the same as the fore-description), and $A^2$ is a group represented by the general formula (3):

$$-R^{34}-Z^{22}-Y^{22} \quad (3)$$

(Wherein $Y^{22}$, $Z^{22}$ and $R^{34}$ are the same as the fore-description).

Either of $Y^{21}$ and $Y^{22}$ is a polymerizable group, and an acryloyl group is preferable in particular from the viewpoint of capable of being easily copolymerized with a hydrophilic monomer (D).

Either of $Z^{21}$ and $Z^{22}$ is an oxygen atom or a direct bond and an oxygen atom is preferable.

Either of $R^{31}$ and $R^{34}$ are a direct bond or an alkylene group having a linear chain, a branched chain or an aromatic ring having 1 to 12 carbons and an alkylene group having 2 to 4 carbons is preferable.

Either of $U^1$, $U^2$ and $U^3$ represents a group containing a urethane group in the molecular chain of the compound (A).

In $U^1$ and $U^3$, $E^{21}$ and $E^{22}$ are respectively a —CONH— group, a —NHCO— group or a divalent group derived from diisocyanate selected from the group consisting of a saturated or unsaturated aliphatic group, an alicyclic group and an aromatic group. Wherein examples of the divalent group derived from diisocyanate selected from the group consisting of a saturated or unsaturated aliphatic group, an alicyclic group and an aromatic group include divalent groups derived from saturated aliphatic diisocyanate such as ethylene diisocyanate, 1,3-diisocyanate propane and hexamethylene diisocyanate; divalent groups derived from alicyclic diisocyanate such as 1,2-diisocyanatocyclohexane, bis(4-isocyanatocyclohexyl)methane and isophorone diisocyanate; divalent groups derived from aromatic diisocyanate such as tolylene diisocyanate and 1,5-diisocyanatonaphthalene; and divalent groups derived from unsaturated aliphatic diisocyanate such as 2,2'-diisocyanatediethyl fumarate. Among these, a divalent group derived from hexamethylene diisocyanate, a divalent group derived from tolylene diisocyanate and a divalent group derived from isophorone diisocyanate are preferable because they are comparatively available and strength is easily imparted.

In $U^1$, when $E^{21}$ is a —NHCO— group, $X^{21}$ is a direct bond, $X^{25}$ is an oxygen atom or an alkylene glycol group, and $E^{21}$ forms a urethane bond which is represented by the formula: —NHCOO—, with $X^{25}$. Further, when $E^{21}$ is a —CONH— group, $X^{21}$ is an oxygen atom or an alkylene glycol group, $X^{25}$ is a direct bond, and $E^{21}$ forms a urethane bond which is represented by the formula: —OCONH—, with $X^{21}$. Further, when $E^{21}$ is a divalent group derived from the fore-mentioned diisocyanate, each of $X^{21}$ and $X^{25}$ is independently selected from an oxygen atom and preferably an alkylene glycol group having 1 to 6 carbons, and $E^{21}$ forms two urethane bonds with $X^{21}$ and $X^{25}$. $R^{32}$ is an alkylene group having a linear chain or a branched chain having 1 to 6 carbons.

In $U^2$, $E^{24}$ represents a divalent group derived from diisocyanate selected from the group consisting of a saturated or unsaturated aliphatic group, an alicyclic group and an aromatic group, as described above. Hereat, examples of the divalent group derived from diisocyanate selected from the group consisting of a saturated or unsaturated aliphatic group, an alicyclic group and an aromatic group include divalent groups which are similar as in the fore-mentioned $U^1$ and $U^3$. Among these, a divalent group derived from hexamethylene diisocyanate, a divalent group derived from tolylene diisocyanate and a divalent group derived from isophorone diisocyanate are preferable because they are comparatively available and strength is easily imparted. Further, $E^{24}$ forms two urethane bonds with $X^{27}$ and $X^{28}$. Each of $X^{27}$ and $X^{28}$ is independently an oxygen atom or preferably an alkylene glycol group having 1 to 6 carbons, and each of $R^{37}$ and $R^{38}$ is independently an alkylene group a linear chain or a branched chain having 1 to 6 carbons.

In $U^3$, $R^{33}$ is an alkylene group having a linear chain or a branched chain having 1 to 6 carbons. When $E^{22}$ is a —NHCO— group, $X^{22}$ is an oxygen atom or an alkylene glycol group, $X^{26}$ is a direct bond, and $E^{22}$ forms a urethane bond which is represented by the formula: —NHCOO—, with $X^{22}$. Further, when $E^{22}$ is a —CONH— group, $X^{22}$ is a direct bond, $X^{26}$ is an oxygen atom or an alkylene glycol group, and $E^{22}$ forms a urethane bond which is represented by the formula: —OCONH—, with $X^{26}$. Further, when $E^{22}$ is a divalent group derived from the fore-mentioned diisocyanate, each of $X^{22}$ and $X^{26}$ is independently selected from an oxygen atom or preferably an alkylene glycol group having 1 to 6 carbons, and $E^{22}$ forms two urethane bonds with $X^{22}$ and $X^{26}$.

Hereat, the example of alkylene glycol having preferably 1 to 20 carbons in the fore-mentioned $X^{21}$, $X^{25}$, $X^{27}$, $X^{28}$, $X^{22}$ and $X^{26}$ includes a group represented by the general formula (8) and the like:

$$—O—(C_xH_{2x}—O)_y— \quad (8)$$

(Wherein x indicates an integer of 1 to 4 and y indicates an integer of 1 to 5).

Either of $S^1$ and $S^2$ is a group represented by the general formula (5), as described above.

In the general formula (5), each of $R^{23}$, $R^{24}$, $R^{25}$, $R^{26}$, $R^{27}$ and $R^{28}$ is independently an alkyl group having 1 to 6 carbons, an alkyl group substituted with fluorine or a phenyl group.

The example of the alkyl group substituted with fluorine includes a group represented by $-(CH_2)_m-C_nF_{2n+1}$ ($m=1$ to 10, $n=1$ to 10), and its specific example includes, for example, side chain alkyl groups substituted with fluorine such as a 3,3,3-trifluoro-n-propyl group, a 2-(perfluorobutyl)ethyl group and 2-(perfluorooctyl)ethyl group; and branched chain alkyl groups substituted with fluorine such as a 2-(perfluoro-5-methylhexyl)ethyl group, etc. Further, in the present invention, when the compound (A) having such an alkyl group substituted with fluorine is used and its content is increased, the lipid-deposit resistance of the ocular lens material obtained tends to be improved.

Further, k is an integer of 10 to 100 and L is 0 or an integer of 1 to 90. K+L is preferably an integer of 10 to 100 and more preferably 10 to 80. When K+L is larger than 100, the molecular weight of the compound (A) is enlarged, its solubility to a pyrrolidone derivative and a hydrophilic monomer other than this is deteriorated, they are not homogeneously dissolved at mixing, and phase separation occurs at polymerization to be opaque; therefore a homogeneous and transparent ocular lens material tends to be not obtained. Further, when K+L is less than 10, the oxygen permeability of the ocular lens material obtained is lowered and its flexibility tends to be lowered.

Further, n is preferably 0 or an integer of 1 to 10. When n is larger than 10, the molecular weight of the compound (A) is enlarged, its solubility with a pyrrolidone derivative and a hydrophilic monomer other than this is deteriorated, they are not homogeneously dissolved at mixing, and phase separation occurs at polymerization to be opaque; therefore a homogeneous and transparent ocular lens material tends to be not obtained. The symbol n is more preferably 0 or an integer of 1 to 5.

Further, the compound (A) is a polysiloxane macromonomer in which the polymerizable groups represented by the general formula (9):

$$A^1-U^1-T^1-U^4-(-S^1-U^2-)_n-S^2-U^5-T^2-U^3-A^2 \quad (9)$$

(Wherein $A^1$, $A^2$, $U^1$, $U^2$, $U^3$, $S^1$, $S^2$ and n are the same as the general formula (1), and $U^4$ and $U^5$ are respectively the same as $U^1$ and $U^3$. Provided that $Y^{21}$ and $Y^{22}$ in $A^1$ and $A^2$ are a (meth)acryloyl group, a vinyl group or an allyl group.)

$T^1$ and $T^2$ are a segment containing a hydrophilic polymer or a segment containing a hydrophilic oligomer represented by the general formula (10):

$$-Q-(CH_2CHD-Q-)_n- \quad (10)$$

(Wherein D is a hydrogen atom, a methyl group or a hydroxy group, Q is a direct bond or an oxygen atom, and n is 5 to 10000), or the general formula (11):

$$-(M)x- \quad (11)$$

(Wherein M indicates a hydrophilic monomer unit selected from 1,3-MMP, N-VP, (meth)acrylic acid, (meth)acrylic acid salt, N,N-dimethylacrylamide, N,N-diethylacrylamide, 2-hydroxyethyl (meth)acrylate, tetrahydrofuran, oxetane, oxazoline, 2-methacryloyloxyethyl phosphoryl choline and the like, and a polymerization chain of the polymer composed by these units may be a linear chain or a branched chain and may be random or block. X is 5 to 10000))
are bound with a siloxane main chain through at least one of urethane bonds.

The compound (A) may further have a hydrophilic polymer structure. The solubility of the compound (A) with a hydrophilic monomer is improved by the structure, and the wettability of a material comprising these can be improved. The structure of the hydrophilic polymer unit includes at least one of polymers obtained by polymerizing monomers, for example, polyethylene glycol, polypropylene glycol, polyvinyl alcohol, polyvinylpyrrolidone, poly(meth)acrylic acid, poly(meth)acrylate, poly(2-hydroxyethyl(meth)acrylate), polytetrahydrofuran, polyoxetane, polyoxazoline, polydimethyl acrylamide, polydiethylacrylamide and polymers containing a zwitter ionic group such as poly(2-methacryloyloxyethyl phosphoryl choline). The molecular weight of the hydrophilic polymer structural unit is 100 to 1000000 and preferably 1000 to 500000. When the molecular weight is less than 100, hydrophilicity enough for dissolving the compound (A) in a hydrophilic monomer tends to be unable to be imparted. On the other hand, when the molecular weight exceeds 1000000, both of hydrophilic domain and hydrophobic domain is enlarged and a transparent material tends to be not obtained.

The typical example of the compound (A) includes, for example, a compound represented by the formula (hereinafter, referred to as the compound (A-1)):

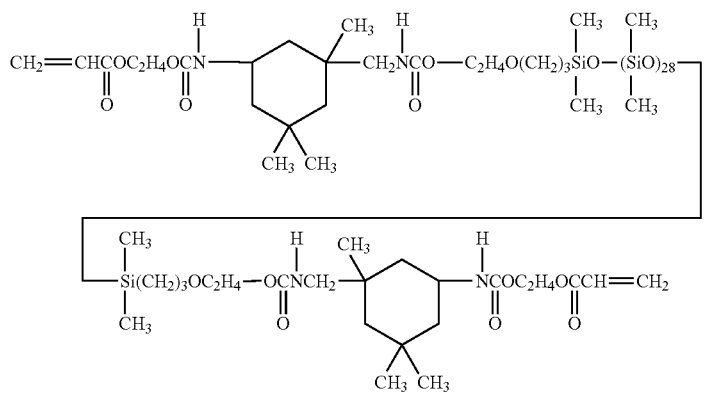

a compound represented by the formula (hereinafter, referred to as the compound (A-2)):

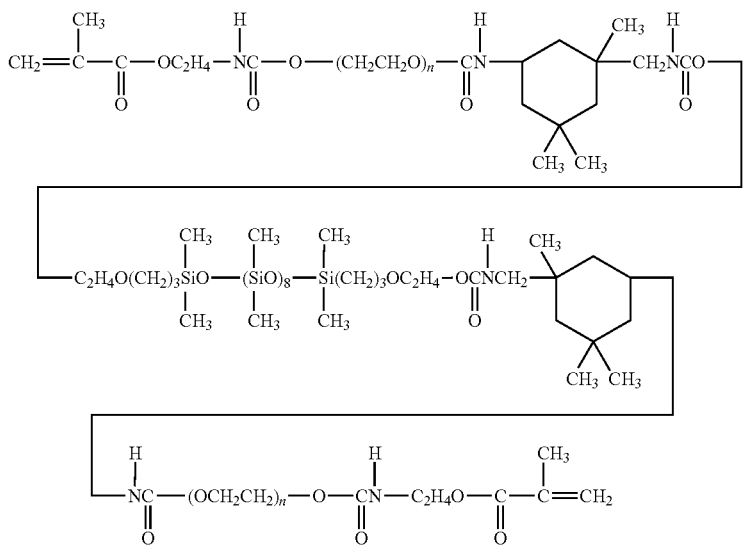

and the like. These can be used alone or a mixture of 2 or more of compounds can be used.

At least one of pyrrolidone derivatives (B) in which the polymerizable group is a methylene group which is used in the present invention, for example, 1-alkyl-3-methylene-2-pyrrolidone, 1-alkyl-5-methylene-2-pyrrolidone, and 5-alkyl-3-methylene-2-pyrrolidone is a component which imparts excellent flexibility and wettability to an ocular lens material and improves patient comfort. Further, in the reaction system, since at least one of pyrrolidone derivatives (B) in which the polymerizable group is a methylene group has higher polymerizability in comparison with a case that N-vinyl pyrrolidone being a hydrophilic monomer is used, the elution of an unreacted monomer and the like which remain in a product material can be suppressed at a low level. When the use amount of at least one of pyrrolidone derivatives (B) is increased, excellent surface wettability and the lubricity/easy lubricating property of surface can be imparted to the ocular lens material. Specifically, the use amount of at least one of pyrrolidone derivatives (B) is preferably 5 to 60% by weight based on the total polymerizable components and more preferably 10 to 55% by weight. When the use amount of at least one of pyrrolidone derivatives (B) is less than 5% by weight, desired surface wettability and the lubricity/easy lubricating property of surface cannot be achieved and the wettability of material surface tends to be inferior. On the other hand, when it exceeds 60% by weight, oxygen permeability is dominated by water content, adequate oxygen tends to be not supplied to the cornea considering the wearing state at continuous wearing or at short sleep.

The at least one of pyrrolidone derivatives (B) in which the polymerizable group is a methylene group which is used in the present invention includes 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone and the like, but is not limited to these. These can be used alone or 2 or more can be used in combination. Among these at least one of pyrrolidone derivatives (B) in which the polymerizable group is a methylene group, 1-methyl-3-methylene-2-pyrrolidone, 1-methyl-5-methylene-2-pyrrolidone and 5-methyl-3-methylene-2-pyrrolidone are preferable from the viewpoints that excellent hydrophilicity, a material superior in the hydrophilicity is obtained by using a small amount and its preparing method is comparatively easy.

In order to further improve the oxygen permeability of an obtained ocular lens material and impart flexibility in the present invention, a silicone compound (C) other than the fore-mentioned compound (A) is preferably comprised as the ocular lens material.

The silicone compound (C) includes silicone-containing alkyl (meth)acrylate, silicone-containing styrene derivative and diesters of silicone-containing fumaric acid. These can be used alone or 2 or more of compounds can be used in combination.

Further, "~(meth)acrylate" described in the present specification means "~acrylate and/or ~methacrylate", and other (meth)acrylate derivative is also similar.

Examples of the silicone-containing alkyl (meth)acrylate include trimethylsiloxydimethylsilylmethyl (meth)acrylate, trimethylsiloxydimethylsilylpropyl (meth)acrylate, methylbis(trimethylsiloxy)silylpropyl (meth)acrylate, tris(trimethylsiloxy)silylpropyl (meth)acrylate, mono [methylbis(trimethylsiloxy)siloxy]bis(trimethylsiloxy)silylpropyl (meth) acrylate, tris [methylbis(trimethylsiloxy)siloxy]silylpropyl (meth)acrylate, methylbis(trimethylsiloxy)silylpropylglyceryl (meth)acrylate, tris(trimethylsiloxy)silylpropylglyceryl (meth)acrylate, mono [methylbis(trimethylsiloxy)siloxy]bis (trimethylsiloxy)silylpropylglyceryl (meth)acrylate, trimethylsilylethyltetramethyldisiloxypropylglyceryl (meth)acrylate, trimethylsilylmethyl (meth)acrylate, trimethylsilylpropyl (meth)acrylate, trimethylsilylpropylglyceryl (meth)acrylate, trimethylsiloxydimethylsilylpropylglyceryl (meth)acrylate, methylbis(trimethylsiloxy)silylethyltetramethyldisiloxymethyl (meth)acrylate, tetramethyltriisopropylcyclotetrasiloxanylpropyl (meth)

acrylate, tetramethyltriisopropylcyclotetrasiloxybis(trimethylsiloxy) silylpropyl (meth)acrylate and the like.

Examples of the silicone-containing styrene derivative include a compound represented by the general formula (12):

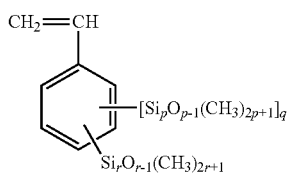

(12)

(Wherein p indicates an integer of 1 to 15, q indicates 0 or 1, and r indicates an integer of 1 to 15). In the silicone-containing styrene derivative represented by the general formula (12), when p or r is an integer of 16 or more, purification and synthesis are difficult and the hardness of the ocular lens material obtained tends to be lowered. Further, when q is an integer of 2 or more, synthesis of the silicone-containing styrene derivative tends to be difficult.

Examples of the silicone-containing styrene derivative represented by the fore-mentioned general formula (12) include tris(trimethylsiloxy)silylstyrene, bis(trimethylsiloxy)methylsilylstyrene, (trimethylsiloxy)dimethylsilylstyrene, tris(trimethylsiloxy)siloxydimethylsilylstyrene, [bis(trimethylsiloxy)methylsiloxy]dimethylsilylstyrene, (trimethylsiloxy)dimethylsilylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris(pentamethyldisiloxy)silylstyrene, tris(trimethylsiloxy)siloxybis(trimethylsiloxy)silylstyrene, bis(heptamethyltrisiloxy)methylsilylstyrene, tris[methylbis(trimethylsiloxy)siloxy]silylstyrene, trimethylsiloxybis [tris(trimethylsiloxy)siloxy]silylstyrene, heptakis(trimethylsiloxy)trisilylstyrene, nonamethyltetrasiloxyundecyl-
methylpentasiloxymethylsilylstyrene, tris[tris(trimethylsiloxy)siloxy]silylstyrene, (tristrimethylsiloxyhexamethyl)tetrasiloxy[tris(trimethylsiloxy)siloxy]tri methylsiloxysilylstyrene, nonakis(trimethylsiloxy)tetrasilylstyrene, bis(tridecamethylhexasiloxy)methylsilylstyrene, heptamethylcyclotetrasiloxanylstyrene, hepatamethylcyclotetrasiloxybis(trimethylsiloxy)silylstyrene, tripropyltetramethylcyclotetrasiloxanylstyrene, trimethylsilylstyrene and the like.

Examples of the silicone-containing fumaric acid diester include a compound represented by the general formula (13):

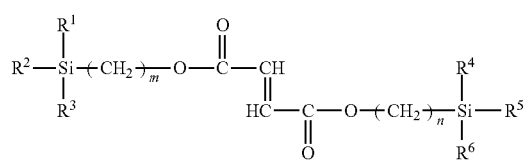

(13)

(Wherein each of $R^1$, $R^2$, $R^3$, $R^4$, $R^5$ and $R^6$ indicates independently a methyl group, a trimethylsiloxy group represented by the formula:

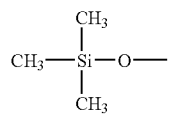

and each of m and n indicates an integer of 1 to 3).

Examples of the fore-mentioned compound represented by the general formula (13) include bis(3-(trimethylsilyl)propyl)fumarate, bis(3-(pentamethyldisiloxanyl)propyl)fumarate, bis(3-((1,3,3,3-tetramethyl-1-trimethylsiloxy)disiloxanyl)propyl)fumarate, bis(tris(trimethylsiloxy)silylpropyl)fumarate, and the like. These can be used alone or a mixture of 2 or more of compounds can be used.

Among these, the silicone-containing alkyl (meth)acrylate is preferable from the viewpoints of imparting the flexibility to a material and the copolymerizability with the compound (A) and the pyrrolidone compound (B), and tris(trimethylsiloxy)silylpropyl (meth)acrylate is more preferable from the viewpoints of imparting the polymerizability, oxygen permeability and flexibility.

The use amount of the silicone-containing alkyl (meth)acrylate among the silicone compound (C) is preferably 3 to 65% by weight based on the total polymerizable components and more preferably 5 to 60% by weight. When the use amount of the silicone-containing alkyl (meth)acrylate is less than 3% by weight, the ocular lens material obtained is high modulus and brittle and tends to be inferior in flexibility. On the other hand, when it exceeds 65% by weight, modulus is lowered but the repulsive property is inferior and adhesion of surface tends to be increased.

The use amount of the silicone-containing styrene derivative among the silicone compound (C) is preferably 1 to 30% by weight based on the total polymerizable components and more preferably 3 to 20% by weight. When the use amount of the silicone-containing styrene derivative is less than 1% by weight, the oxygen permeability and mechanical strength of the ocular lens material obtained tend to be unable to be adequately improved. On the other hand, when it exceeds 30% by weight, the flexibility of the ocular lens material obtained tends to be lowered.

The use amount of the silicone-containing fumaric acid diester among the silicone compound (C) is preferably 1 to 50% by weight based on the total polymerizable components and more preferably 3 to 40% by weight. When the use amount of the silicone-containing fumaric acid diesters is less than 1% by weight, the oxygen permeability of the ocular lens material obtained tend to be unable to be adequately improved. On the other hand, when it exceeds 50% by weight, adequate mechanical strength tends to be not obtained.

It is preferable that the ocular lens material of the present invention contains N-substituted acrylamide (D). When N-substituted acrylamide (D) is contained as the ocular lens material, it functions as the solubilizer of the silicone component together with the pyrrolidone compound (B), and a homogeneous hydrogel superior in transparency can be prepared. Only the pyrrolidone derivative (B) without using the N-substituted acrylamide (D) is inferior in solubility with the silicone-containing components such as the compound (A) and the silicone compound (C), and the transparency of the ocular lens material obtained tend to be lowered. To the contrary, in the present invention, the solubility with the silicone-containing compound is improved by simultaneously using the N-substituted acrylamide (D) together with the pyrrolidone derivative (B) and the transparency of the ocular lens material obtained can be improved.

The N-substituted acrylamide (D) includes N,N-dimethyl acrylamide, N,N-diethyl acrylamide, N-(2-hydroxyethyl) acrylamide, N-isopropyl acrylamide, acryloyl morpholine and the like. Among these, N,N-dimethyl acrylamide, N,N-diethyl acrylamide and acryloyl morpholine are preferable from the viewpoint of improving the solubility at a small amount.

In the present invention, the use amount of the N-substituted acrylamide (D) is preferably 3 to 40% by weight based on the total polymerizable components and more preferably 5 to 35% by weight. When the use amount of the N-substituted acrylamide (D) is less than 3% by weight, the polymer becomes opaque and the oxygen permeability of the ocular lens material tends to be lowered. On the other hand, when it exceeds 40% by weight, the N-substituted acrylamide takes in much lipid in the tear fluid because of amphiphatic property and the ocular lens tends to be stained. At this time, when the use amount of the pyrrolidone derivative (B) is lessened for further obtaining desired oxygen permeability, the wettability and lubricity of surface of an ocular lens material tends to be poor.

When the pyrrolidone derivative (B) and the N-substituted acrylamide (D) are used in combination as the ocular lens material of the present invention, the ratio of the pyrrolidone derivative (B) to the N-substituted acrylamide (D) [(B)/(D) (weight ratio)] is preferably at least 40/60, more preferably at least 45/55, and further preferably at least 50/50, because the wettability and lubricity/easy lubricating property of surface of the ocular lens material is feared to be poor when the content of pyrrolidone derivative (B) is low. Further, when the content of pyrrolidone derivative (B) is high, the ratio is preferably at most 100/0, more preferably at most 95/5 and further preferably at most 90/10 because the polymer becomes opaque, the transparency of the ocular lens material is lowered, the hardness of the material itself is heightened and the patient comfort is feared to be adversely affected.

When the silicone compound (C) and the N-substituted acrylamide (D) are further comprised in addition to the compound (A) and the pyrrolidone derivative (B) as the ocular lens material of the present invention, the respective ratios are preferably set as follow. The ratio of the sum of the compound (A) and the silicone compound (C) to the sum of the pyrrolidone derivative (B) and the N-substituted acrylamide (D) [{(A)+(C)}/{(B)+(D)} (weight ratio)] is preferably at least 30/70, more preferably at least 35/65 and further preferably at least 40/60 because the oxygen permeability of the ocular lens material depends on water content and the high oxygen permeability is impossible to be obtained when (B)+(D) is much. Further, the proportion is preferably at most 70/30, more preferably at most 67/33 and further preferably at most 65/35 because the flexibility of the ocular lens material is lost, obtained material has stiffness and sticky surface, patient comfort is adversely affected when (A)+(C) is much.

As a condition simultaneously required together with [{(A)+(C)}/{(B)+(D)} (weight ratio)] of the ratio of {(A)+(C)} to {(B)+(D)}, the ratio of the compound (A) to the silicone compound (C) [(A)/(C) (weight ratio)] is preferably at least 25/75, more preferably at least 27/73 and further preferably at least 30/70 because the surface of the ocular lens material becomes extremely sticky and shape stability of the material is lowered when the silicone compound (C) is much. The ratio is preferably at most 75/25, more preferably at most 73/27 and further preferably at most 70/30 because the ocular lens material has low flexibility, stiffness and brittleness when the compound (A) is much.

Further, in the present invention, a hydrophilic monomer (E) other than the N-substituted acrylamide (D) which is copolymerized together with the pyrrolidone derivative (B) can be used. When the hydrophilic monomer (E) is comprised in the ocular lens material, the flexibility and wettability of surface are imparted to the ocular lens material obtained, the patient comfort is improved and the lubricity/easy lubricating property can be further imparted.

Examples of the hydrophilic monomer (E) usable in the present invention include (meth)acrylamide, hydroxyalkyl (meth)acrylate such as 2-hydroxyethyl (meth)acrylate, hydroxypropyl (meth)acrylate and hydroxybutyl (meth)acrylate; (alkyl)aminoalkyl (meth)acrylate such as 2-dimethylaminoethyl (meth)acrylate and 2-butylaminoethyl (meth)acrylate; alkyleneglycol mono(meth)acrylate such as ethyleneglycol mono(meth)acrylate and propyleneglycol mono(meth)acrylate; polyalkyleneglycol mono(meth)acrylate such as polyethyleneglycol mono(meth)acrylate and polypropyleneglycol mono(meth)acrylate; ethyleneglycol allyl ether; ethyleneglycol vinyl ether; (meth)acrylic acid; aminostyrene; hydroxystyrene; vinyl acetate; glycidyl (meth)acrylate; allylglycidyl ether; vinyl propionate; N,N-dimethylmethacrylamide, N,N-diethylmethacrylamide, N-(2-hydroxyethyl) methacrylamide, N-isopropylmethacrylamide, methacroylmorpholine; N-vinyllactam such as N-vinyl-2-pyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl-2-piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-2-caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam and N-vinyl-3,5,7-trimethyl-2-caprolactam; N-vinylamide such as N-vinylformamide, N-vinyl-N-methylformamide, N-vinyl-N-ethylformamide, N-vinylacetamide, N-vinyl-N-methylacetamide, N-vinyl-N-ethylacetamide and N-vinylphthalimide, and the like. Among these hydrophilic monomers (E), (meth)acrylamide, hydroxyalkyl (meth)acrylate, alkyleneglycol (meth)acrylate, (meth)acrylic acid, N-vinyllactam and N-vinylamide are preferable from the viewpoints that solubility with the silicone-containing compound is superior and wettability is imparted to the ocular lens material. These can be used alone or a mixture of 2 or more of compounds can be used.

Further, for example, when the ocular lens material is prepared and then treated with an acid or a base in a system using a component such as vinyl acetate which is subject to hydrolysis by an acid or base, further flexibility and surface wettability can be imparted to the ocular lens material.

When desired property is further imparted to the ocular lens material obtained, alkyl (meth)acrylate, fluorine-containing alkyl (meth)acrylate, a monomer for adjusting hardness, a polymerizable or non polymerizable ultraviolet absorbent, a dyestuff, an ultraviolet absorbing dyestuff and the like can be also used as a monomer (F).

Alkyl (meth)acrylate is a component for adjusting the hardness of the ocular lens material to impart hardness and softness.

Examples of the alkyl (meth)acrylate include linear, branched or cyclic alkyl (meth)acrylate such as methyl (meth)acrylate, ethyl (meth)acrylate, isopropyl (meth)acrylate, n-propyl (meth)acrylate, isobutyl (meth)acrylate, n-butyl (meth)acrylate, 2-ethylhexyl (meth)acrylate, n-octyl (meth) acrylate, n-decyl (meth)acrylate, n-dodecyl (meth)acrylate, tert-butyl (meth)acrylate, pentyl (meth)acrylate, tert-pentyl (meth)acrylate, hexyl (meth)acrylate, heptyl (meth)acrylate, nonyl (meth)acrylate, stearyl (meth)acrylate, cyclopentyl (meth)acrylate and cyclohexyl (meth)acrylate. These can be used alone or a mixture of 2 or more of compounds can be used.

Fluorine-containing alkyl (meth)acrylate is a component for improving the lipid-deposit resistance of the ocular lens material.

Examples of the fluorine-containing alkyl (meth)acrylate includes a compound represented by the general formula (14):

$$CH_2=CR^4COOC_sH_{(2s-t+1)}F_t \qquad (14)$$

(Wherein $R^4$ indicates a hydrogen atom or $CH_3$, s indicates an integer of 1 to 15, t indicates an integer of 1 to (2s+1)).

Specific examples of the fore-mentioned general formula (14) include, for example, 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl(meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4, 4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9, 9,10,10-hexadecafluorodecyl (meth)acrylate, 3,3,4,4,5,5,6,6, 7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11, 11-nonadecafluoroundecyl (meth)acrylate, 3,3,4,4,5,5,6,6,7, 7,8,8,9,9,10,10,11,11,12,12-eicosafluorododecyl (meth) acrylate and the like. These can be used alone or a mixture of 2 or more of compounds can be used.

The contents of the alkyl (meth)acrylate and fluorine-containing alkyl (meth)acrylate are preferably at most 20% by weight based on the total polymerizable components and more preferably at most 10% by weight so that the effect by polymerization components such as the compound (A) and the pyrrolidone derivative (B) being essential components, further, the silicone compound (C), the N-substituted acrylamide (D) and the hydrophilic monomer (E) is expressed. Further, the contents are at least 0.01% by weight based on the fore-mentioned components and preferably at least 0.1% by weight in order to adequately express the effect of the alkyl (meth)acrylate and the fluorine-containing alkyl (meth)acrylate.

The monomer for adjusting hardness is a component adjusting the hardness of the ocular lens material and imparting hardness and softness.

Examples of the monomer for adjusting hardness include alkoxyalkyl (meth)acrylate such as 2-ethoxyethyl (meth) acrylate, 3-ethoxypropyl (meth)acrylate, 2-methoxyethyl (meth)acrylate and 3-methoxypropyl (meth)acrylate; alkylthio alkyl (meth)acrylate such as ethylthioethyl (meth)acrylate and methylthioethyl (meth)acrylate; styrene; α-methylstyrene; alkyl styrene such as methylstyrene, ethylstyrene, propylstyrene, butylstyrene, t-butylstyrene, isobutylstyrene and pentylstyrene; alkyl-α-methylstyrene such as methyl-α-methylstyrene, ethyl-α-methylstyrene, propyl-α-methylstyrene, butyl-α-methylstyrene, t-butyl-α-methylstyrene, isobutyl-α-methylstyrene and pentyl-α-methylstyrene, and the like. These can be used alone or a mixture of 2 or more of compounds can be used.

The content of the monomer for adjusting hardness is at least 1% by weight and preferably at least 3% by weight in order to adequately impart desired hardness and softness for the ocular lens material. Further, the content is at most 30% by weight and preferably at most 20% by weight in order not to lower the oxygen permeability and mechanical strength of the ocular lens material.

The polymerizable or non polymerizable ultraviolet absorbent, the dyestuff, and the ultraviolet absorbing dyestuff are components for imparting ultraviolet absorption property to the ocular lens material and coloring the material.

Specific examples of the fore-mentioned polymerizable or non polymerizable ultraviolet absorbent include polymerizable benzophenone type ultraviolet absorbents such as 2-hydroxy-4-(meth)acryloyloxybenzophenone, 2-hydroxy-4-(meth)acryloyloxy-5-t-butylbenzophenone, 2-hydroxy-4-(meth)acryloyloxy-2',4'-dichlorobenzophenone, 2-hydroxy-4-(2'-hydroxy-3'-(meth)acryloyloxypropoxy) benzophenone; polymerizable benzotriazole type ultraviolet absorbents such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole, 2-(2'-hydroxy-5'-(meth)acryloyloxypropylphenyl-3'-t-butylphenyl)-5-chloro-2H-benzotriazole and 2-(2'-hydroxy-5'-(2''-methacryloyloxyethoxy)-3'-t-butylphenyl)-5-methyl-2H-benzotriazole; polymerizable salicylic acid type ultraviolet absorbents such as 2-hydroxy-4-methacryloyloxymethyl phenylbenzoate; 2-cyano-3-phenyl-3-(3'-(meth)acryloyloxyphenyl)propenylic acid methyl ester and the like. These can be used alone or a mixture of 2 or more of compounds can be used.

Specific examples of the fore-mentioned polymerizable dyestuff include polymerizable azo type dyestuff such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-(phenylazo)-phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamide-anilino)-4,6-bis(1'-(o-tolylazo)-2'-naphthylamino)-1,3,5-triazine, 2-(m-vinylanilino)-4-(4'-nitrophenylazo)-anilino)-6-chloro-1,3,5-triazine, 2-(1'-(o-tolylazo)-2'-naphthyloxy)-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1'-(o-tolylazo)-2'-naphthyl)-3-vinyl phthalic acid monoamide, N-(1'-(o-tolylazo)-2'-naphthyl)-6-vinyl phthalic acid monoamide, 3-vinylphthalic acid-(4'-(p-sulfophenylazo)-1'-naphthyl) monoester, 6-vinylphthalic acid-(4'-(p-sulfophenylazo)-1'-naphthyl) monoester, 3-(meth)acryloylamide-4-phenylazophenol, 3-(meth)acryloylamide-4-(8'-hydroxy-3', 6'-disulfo-1'-naphthylazo)-phenol, 3-(meth)acryloylamide-4-(1'-phenylazo-2'-naphthylazo)-phenol, 3-(meth) acryloylamide-4-(p-tolylazo)-phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1,3, 5-triazine, 2-amino-4-(N-methyl-p-(4'-hydroxyphenylazo) anilino)-6-isopropenyl-1,3,5-triazine, 2-amino-4-(m-(3'- methyl-1'-phenyl-5'-hydroxy-4'-pyrrazolylazo)anilino)-6-isopropenyl-1,3,5-triazine, 2-amino-4-(N-methyl-p-(3'-methyl-1'-phenyl-5'-hydroxy-4'-pyrrazolylazo)anilino)-6-isopropenyl-1,3,5-triazine, 2-amino-4-(p-phenylazoanilino)-6-isopropenyl-1,3,5-triazine and 4-phenylazo-7-(meth)acryloylamide-1-naphthol; polymerizable anthraquinone type dyestuff such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis(4'-vinylbenzoylamide)-9,10-anthraquinone, 1,4-bis(4'-isopropenylbenzoylamide)-9,10-anthraquinone, 1,5'-bis(4'-vinylbenzoylamide)-9,10-anthraquinone, 1,5-bis(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamide-9,10-anthraquinone, 2-(3'-(meth)acryloyamide-anilino)-4-(3'-(3''-sulfo-4''-aminoanthraquinon-1''-yl-amino-anilino)-6-chloro-1,3,5-triazine, 2-(3'-(meth)acryloyamide-anilino)-4-(3'-(3''-sulfo-4''-aminoanthraquinon-1''-yl)-amino-anilino)-6-hydrazino-1,3,5-triazine, 2,4-bis((4'-methoxyanthraquinon-1''-yl)-amino)-6-(3'-vinylanilino)-1,3,5-triazine and 2-(2'-vinylphenoxy)-4-(4'-(3''-sulfo-4''-aminoanthraquinon-1''-yl-amino)-anilino)-6-chloro-1,3,5-triazine; polymerizable nitro type dyestuff such as o-nitroanilinomethyl (meth)acrylate; polymerizable phthalocyanine type dyestuff such as (meth)acryloyl-modified tetramino copper phthalocyanine and (meth)acryloyl-modified (dodecanoyl-modified tetramino copper phthalocyanine), etc. These can be used alone or a mixture of 2 or more of compounds can be used.

Specific examples of the fore-mentioned polymerizable ultraviolet absorbing dyestuff include polymerizable benzophenone type ultraviolet absorbing dyestuff such as 2,4-dihydroxy-3(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth) acryloyloxyethylphenylazo)benzophenone, 2,4-dihydroxy-5-(o-(meth) acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di(meth)acryloyloxyethylamino)phenylazo)benzophenone, 2,4-dihydroxy-5-(o-(N,N-di(meth) acryloyloxyethylamino) phenylazo)benzophenone, 2,4-dihydroxy-3-(p-(N-ethyl-N-(meth) acryloyloxyethylamino) phenylazo) benzophenone, 2,4-dihydroxy-5-(p-(N-ethyl-N-(meth)acryloyloxyethylamino)phenylazo)benzophenone, 2,4-dihydroxy-3-(o-(N-ethyl-N-(meth)acryloyloxyethylamino)phenylazo)benzophenone, 2,4-dihydroxy-5-(o-(N-ethyl-N-(meth) acryloyloxyethylamino)phenylazo)benzophenone, 2,4-dihydroxy-3-(p-(N-ethyl-N-(meth)acryloylamino) phenylazo)benzophenone, 2,4-dihydroxy-5-(p-(N-ethyl-N-(meth)acryloylamino)phenylazo)benzophenone, 2,4-dihydroxy-3-(o-(N-ethyl-N-(meth)acryloylamino) phenylazo)benzophenone and 2,4-dihydroxy-5-(o-(N-ethyl-N-(meth)acryloylamino)phenylazo)benzophenone; polymerizable benzoic acid type ultraviolet absorbing dyestuff such as 2-hydroxy-4-(p-styrenoazo)benzoic acid phenyl, and the like. These can be used alone or a mixture of 2 or more of compounds can be used.

The contents of the polymerizable ultraviolet absorbent, the polymerizable dyestuff, and the polymerizable ultraviolet absorbing dyestuff are greatly influenced by the thickness of a lens. The use amount is at most 3 parts based on 100 parts of the total amount of polymerization components and preferably 0.01 to 2 parts. When these amounts exceed 3 parts, the mechanical strength of the ocular lens material and the like tend to be lowered. Further, considering the toxicity of the ultraviolet absorbent and dyestuff, it tends to be not suitable as the ocular lens material such as a contact lens which directly contacts with biomedical tissues and an intraocular lens which is inserted within a living organ. In particular, in case of the dyestuff, when the amount to much, the color of a lens thickens, transparency is lowered, and the lens hardly transmits visible light. Further, when a water content is low in a ocular lens prepared and the elution of the non-polymerizable ultraviolet absorbent, the dyestuff, and the ultraviolet absorbing dyestuff is not confirmed, non-polymerizable components such as 2-(4,6-diphenyl-1,3,5-triazin-2-yl)-5-(hexyloxy)phenol and 2-(5-chloro-2H-benzotriazol-2-yl)-6-(1,1-dimethylethyl)-4-methylphenol can be also used.

In the ocular lens material of the present invention in which the compound (A) having bifunctional polymerizable group and the pyrrolidone derivative (B) are main components, the residue of the polymerizable components is very few, and a crosslinking agent is not basically required. However, a crosslinking agent (G) for adjusting the flexibility and hardness of the material can be added.

Examples of the crosslinking agent (G) used in the present invention include allyl methacrylate, vinyl methacrylate, 4-vinylbenzyl methacrylate, 3-vinylbenzyl methacrylate, methacryloyloxyethyl acrylate, ethyleneglycol dimethacrylate, diethyleneglycol dimethacrylate, diethyleneglycol diallyl ether, triethyleneglycol dimethacrylate, tetraethyleneglycol dimethacrylate, propyleneglycol dimethacrylate, dipropyleneglycol dimethacrylate, butanediol dimethacrylate, trimethylolpropane trimethacrylate, 2,2-bis(p-methacryloyloxyphenyl)hexafluoropropane, 2,2-bis(m-methacryloyloxyphenyl)hexafluoropropane, 2,2-bis(o-methacryloyloxyphenyl)hexafluoropropane, 2,2-bis(p-methacryloyloxyphenyl)propane, 2,2-bis(m- methacryloyloxyphenyl)propane, 2,2-bis(o-methacryloyloxyphenyl)propane, 1,4-bis(2-methacryloyloxyhexafluoroisopropyl)benzene, 1,3-bis(2-methacryloyloxyhexafluoroisopropyl)benzene, 1,2-bis(2-methacryloyloxyhexafluoroisopropyl)benzene, 1,4-bis(2-methacryloyloxyisopropyl)benzene, 1,3-bis(2-methacryloyloxyisopropyl)benzene, 1,2-bis(2-methacryloyloxyisopropyl)benzene, and the like. These can be used alone or a mixture of 2 or more of compounds can be used.

The content of the crosslinking agent (G) is at most one part based on 100 parts by weight (hereinafter, referred to as part) of the total amount of the polymerizable components other than the crosslinking agent and preferably at most 0.8 part so that the ocular lens material is not brittle. Further, the content is at least 0.05 part based on 100 parts of the total amount of the polymerizable components other than the crosslinking agent and preferably at least 0.1 part, in order to improve the mechanical strength of the ocular lens material and adequately express the effect of imparting durability.

In the ocular lens material of the present invention, when the crosslinking agent (G) is used, the compound (A) and the crosslinking agent (G) are simultaneously used as crosslinkable components; therefore the copolymerizability of the ocular lens material is remarkably improved and the various physical properties of the ocular lens material obtained can be improved.

The stress relaxation coefficient of the ocular lens material of the present invention indicates the relaxation coefficient of stress for 30 seconds under loading a fixed load and is preferably 8 to 15% and more preferably 8 to 13%. When it is less than 8%, the material is superior in stress relaxation but the elongation of the material is not observed and flexibility tends to be lacking. On the other hand, when it exceeds 15%, the material is lacking in stress relaxation, the rigidity to keep its shape is inferior, lens movement on eyes tends to be poor and it is occasionally adhered to the cornea. Consequently, it cannot be said that the material has suitable stress relaxation as an ocular lens.

Further, the tensile modulus of the ocular lens material of the present invention is preferably 0.2 to 0.8 MPa and more preferably 0.2 to 0.7 MPa. When it is less than 0.2 MPa, the material has no body, is inferior in shape stability on fingers when being used as an ocular lens, and its handling tends to be difficult. On the other hand, when it exceeds 0.8 MPa, the material is hard, deteriorates patient comfort, and tends to be a cause for phisiological responses such as corneal staining and conjunctive staining. Accordingly, it cannot be said that either of them has flexibility suitable for an ocular lens.

Further, the ocular lens material of the present invention is required to be that both of the stress relaxation coefficient and tensile modulus are within a preferable range. A material in which both is not within the range generates possibly lens adhesion to cornea or the staining of cornea and conjunctiva at continuous wearing or at wearing state at short sleep and the like and it can be said that such material is an inappropriate material as a contact lens. It is necessary for comfortable wearing that the material has good balance in the fore-mentioned stress relaxation and flexibility.

The percentage of water content of the ocular lens material of the present invention is preferably 10 to 60% by weight and more preferably 32 to 55% by weight. When the percentage of water content is less than 10% by weight, the material is semi hard, and for example, when it is used as a contact lens, the patient comfort tends to be deteriorated. On the other hand, when the percentage of water content exceeds 60% by weight, oxygen permeability becomes dependent on the percentage of water content and adequate oxygen tends to be not fed to cornea considering continuous wearing or wearing state at short sleep.

The ocular lens material of the present invention can be prepared according to the following procedure.

a) A step of obtaining a mixed solution comprising at least one kind of a compound (A) having ethylenically unsaturated groups and polydimethylsiloxane structures through a urethane bond, a hydrophilic monomer (B) comprising at least one kind of a pyrrolidone derivative in which a polymerizable group is a methylene group and an photo polymerization initiator and/or a thermal polymerization initiator, b) a step of introducing said mixed solution to a mold for molding, c) a step of obtaining an ocular lens material cured by irradiating UV light on and/or heating the mix solution in said mold for molding, d) a step of carrying out surface treatment to said ocular lens material after demolding said ocular lens material to impart hydrophilicity and deposit resistance, e) a step of removeing an unreacted component from said ocular lens material, and f) a step of hydrating said ocular lens material.

As mentioned above, the fore-mentioned mixed solution comprises preferably the compound (A), the pyrrolidone derivative (B), the silicone compound (C) and the N-substituted acrylamide (D) for expressing the properties of respective polymerizable components.

In the present invention, the fore-mentioned mixed solution comprises preferably a water-soluble organic solvent for improving the uniformity of components in the polymerizable components. Specifically, an unreacted monomer can be diffused in the system to be participated in polymerization reaction after proceeding of the polymerization reaction, by presenting a very slight amount of non-polymerizable organic solvent on the polymerizable components. Concretely, the residual polymerizable components can be reduced by using a water-soluble organic solvent.

The water-soluble organic solvent used in the present invention is a water-soluble organic solvent selected from alcohols having 1 to 4 carbons such as methanol, ethanol, 1-propanol and 2-propanol, or acetone, methylethylketone, dimethylformamide, dimethylsulfoxide, acetonitrile and N-methyl-2-pyrrolidone. As the organic solvent, a solvent capable of dissolving the polymerizable components used may be suitably selected to be used in accordance with the kind of the polymerizable components. Further, these may be used alone or a mixture of 2 or more of compounds may be used.

The water-soluble organic solvent in the present invention can dissolve the polymerizable components of the ocular lens material. Its use amount in the fore-mentioned mixed solution is preferably at most 5% by weight, preferably 0.1 to 5% by weight and further preferably 0.2 to 4% by weight. When the use amount is less than 0.1% by weight, the amount of the residual components at polymerization tends to be increased. On the other hand, when it exceeds 5% by weight, the mixed solution of the polymerizable components in which a diluent is added is heterogeneous, phase separation is generated at polymerization reaction which is carried out later, and the material obtained tends to become opaque.

Further, since the organic solvent used is soluble in water, it can be easily replaced with water at a step of elution treatment which is carried out later.

A bulk polymerization process has been conventionally used in preparation of the ocular lens material. In the polymerization process, since only the polymerizable components are mixed to be provided for polymerization, the viscosity of the system is extremely increased in accordance with proceeding of the polymerization, the components cannot be diffused in the highly viscous system, and a lot of monomers which cannot be participated in the polymerization reaction remain. The elution treatment by water or the organic solvent is carried out for reducing monomers remaining as low as possible.

For obtaining the copolymer composing the ocular lens material of the present invention, the contents of the compound (A) and the pyrrolidone derivative (B) as essential components and if necessary, the contents of the silicone compound (C), the N-substituted acrylamide (D), the hydrophilic monomer (E), the monomer (F) and the crosslinking agent (G) are adjusted so as to be respectively within the fore-mentioned range, and the polymerizable components are polymerized with heating and/or irradiating ultraviolet rays by means of a molding method.

When the polymerizable components are heated to be polymerized by means of a molding method, the polymerizable mixture and a radical polymerization initiator are pipetted in a mold corresponding to the shape of desired ocular lens, then said mold is gradually heated to carry out the polymerization of the polymerizable components, and mechanical process such as cutting process and polishing process is carried out to the molded article obtained if necessary. Further, the cutting may be carried out to the whole area of at least one face or both faces of the molded article (copolymer), and may be carried out to part of at least one face or both faces. As the ocular lens material of the present invention, those which were obtained by cutting at least one side or part of the molded article (copolymer) are preferable in particular, considering versatile use of products such as special lens. The cutting of at least one side of the molded article (copolymer) includes Blanks-molding, namely, a concept that the blanks obtained by polymerization by means of a molding method is cut to obtain a desired shape of an ocular lens. Further, the polymerization may be carried out, for example, by a bulk polymerization method and may be carried out by a solution polymerization method using a solvent and the like.

The specific examples of the fore-mentioned radical polymerization initiator include, for example, 2,2'-azobisisobutyronitrile, 2,2'-azobis(2,4-dimethylvaleronitrile), benzoyl peroxide, t-butyl hydroperoxide, cumene hydroperoxide, lauroyl peroxide, t-butylperoxy hexanoate, 3,5,5-trimethylhexanoyl peroxide and the like. These can be used alone or a mixture of 2 or more of compounds can be used. The amount of said radical polymerization initiator is about 0.001 to 2 parts based on 100 parts of the polymerizable components and preferably 0.01 to 1 part.

The heating temperature at heating the polymerizable components in a mold is at least 50° C. and preferably at least 60° C. from the viewpoints of the shortening of polymerization time and the reduction of the residual monomer components. Further, it is at most 150° C. and preferably at most 140° C. from the viewpoints of suppressing the evaporation of the respective polymerizable components and preventing the deformation of the mold. Further, the heating time at heating the polymerizable components in a mold is at least 10 minutes and preferably at least 20 minutes from the viewpoints of the shortening of polymerization time and the reduction of the residual monomer components. Further, it is at most 120 minutes and preferably at most 60 minutes from the viewpoint of preventing the deformation of the mold. Further, the heating may be carried out by stepwise raising temperature.

When ultraviolet rays are irradiated to the polymerizable components to be polymerized, the polymerizable mixture and a photopolymerization initiator are pipetted in a mold corresponding to the shape of desired ocular lens, then ultraviolet rays are irradiated to said mold to carry out the polymerization of the polymerizable components, and mechanical process such as cutting process and polishing process is carried out to the molded article obtained if necessary. Further, the cutting may be carried out to the whole area of at least one face or both faces of the molded article (copolymer), and may be carried out to part of at least one face or both faces. As the ocular lens material of the present invention, those which were obtained by cutting at least one side or part of the molded article (copolymer) are preferable in particular, considering versatile use of products such as special lens. The cutting of at least one side of the molded article (copolymer) includes Blanks-molding, namely, a concept that the blanks obtained by polymerization by means of a molding method is cut to obtain a desired shape of an ocular lens. Further, the polymerization may be carried out, for example, by a bulk polymerization method and may be carried out by a solution polymerization method using a solvent and the like. Further, in the present invention, the polymerization is carried out by the fore-mentioned irradiation of ultraviolet rays, but the irradiation of electron beam can be carried out in place of the irradiation of ultraviolet rays. In this case, the polymerizable components can be polymerized without a photo polymerization initiator.

The quality of a material of the mold used in polymerization by the irradiation of ultraviolet rays is preferably multi-purpose resins such as a polypropylene, a polystyrene, a nylon and a polyester which can transmit ultraviolet rays necessary for curing the material, and may be glass. These are molded and processed to prepare desired shapes. After the polymerizable components and the photo polymerization initiator, a dyestuff, an ultraviolet-ray absorbent and an organic diluent are mixed and pipetted in a mold which is corresponded to the shape of a lens for the eyes or not corresponded, and ultraviolet rays are irradiated to the mold to carry out the polymerization of the polymerizable components. The wavelength range of UV irradiated can be selected in accordance with the function of the ocular lens material. However, the kind of the photo polymerization initiator used is required to be selected depending on the UV wavelength region irradiated.

The preferable irradiance of ultraviolet ray at irradiating ultraviolet ray to the polymerizable components in the mold is at least $1.0\,mW/cm^2$ for adequately curing the material and at most $50\,mW/cm^2$ for preventing the deterioration of the material. The irradiation time is preferably at least 1 minute for adequately curing the material. The irradiation of ultraviolet rays may be carried out at one step and ultraviolet rays with different intensity may be irradiated stepwise. Further, heating may be simultaneously carried out at irradiation of ultraviolet rays during polymerization and thereby, the polymerization reaction is promoted and an ocular lens can be effectively molded.

The fore-mentioned heating temperature is preferably at least 25° C. from the viewpoint of promoting the reaction, more preferably at least 30° C. and further preferably at most 100° C. from the viewpoint of suppressing the deformation of the mold, more preferably at most 90° C. After polymerization, mechanical process such as cutting process and polishing process is carried out to the molded article obtained if necessary. Further, the cutting may be carried out to the whole area of at least one face or both faces of the molded article (copolymer), and may be carried out to part of at least one face or both faces. As the ocular lens material of the present invention, those which were obtained by cutting at least one side or part of the molded article (copolymer) are preferable in particular, considering versatile use of products such as special lens. The cutting of at least one side or part of the molded article (copolymer) includes namely, a concept that blanks obtained by polymerization by means of a molding method is cut to obtain a desired shape of an ocular lens. Further, in the present invention, the polymerization is carried out by the fore-mentioned irradiation of ultraviolet rays but the irradiation of electron beam can be carried out in place of the irradiation of ultraviolet rays, and in this case, the polymerizable components can be polymerized without a photo polymerization initiator.

The specific example of the fore-mentioned photo polymerization initiator include, for example, phosphine oxide type photo polymerization initiators such as 2,4,6-trimethyl-benzoyl-diphenylphosphine oxide (TPO) and bis(2,4,6-trimethylbenzoyl)-phenylphosphine oxide; benzoin type photo polymerization initiators such as methyl orthobenzoylbenzoate, methyl benzoylformate, benzoin methyl ether, benzoin ethyl ether, benzoin isopropyl ether, benzoin isobutyl ether and benzoin n-butyl ether; phenone type photo polymerization initiators such as 2-hydroxy-2-methyl-1-phenylpropan-1-on, p-isopropyl-α-hydroxyisobutylphenone, p-t-butyl-trichloroacetophenone, 2,2-dimethoxy-2-phenylacetophenone, α,α-dichloro-4-phenoxyacetophenone and N,N-tetraethyl-4,4-diaminobenzophenone; 1-hydroxy-cyclohexyl phenyl ketone; 1-phenyl-1,2-propandion-2-(o-ethoxycarbonyl)oxime; thioxanthone type photo polymerization initiators such as 2-chlorothioxanthone and 2-methylthioxanthone; dibenzosvarron; 2-ethylanthraquinone; benzophenone acrylate; benzophenone; benzyl and the like. These may be used alone or a mixture of 2 or more of these compounds may be used.

Further, a photo sensitizer may be used together with the photo polymerization initiator. The contents of these photo polymerization initiator and photo sensitizer is about 0.001 to 2 parts based on 100 parts of the polymerizable components and preferably 0.01 to 1 part.

When an intraocular lens is prepared by polymerizing the polymerizable components by heating or by polymerizing them by irradiation of ultraviolet rays or electron beams, the haptic of the lens may be separately prepared from the lens and then assembled with the lens, or may be integrally molded together with the lens simultaneously.

The following surface treatments can be carried out for improving the surface property of an ocular lens. By these surface treatments, the surface of the ocular lens material further superior in wettability and/or deposit resistance can be obtained.

Plasma treatment at low temperature which is known to those skilled in the art can be carried out under a specific condition under dilute gas atmosphere such as alkane having 1 to 6 carbons and alkane substituted with fluorine, nitrogen, oxygen, argon, hydrogen, air, water, silane or a mixture thereof. In particular, oxygen alone, or a mixture of oxygen and water, tetrafuluoromethane, organic silane, methane or nitrogen is preferable for a reason that the effect of physical surface improvement by ion etching and chemical surface improvement by radical implantation (the introduction of an oxygen atom) are expected.

Hereat, the plasma treatment at low temperature may be under reduced pressure (low pressure) or under atmospheric pressure. The low-pressure plasma treatment or the atmospheric plasma treatment at low temperature can control the effect of surface improvement by appropriately adjusting high frequency wave RF (for example, 13.56 MHz) and low frequency wave AF (for example, 15.0 to 40.0 kHz), micro wave (for example, 2.45 GHz), output power (optimum value different depending on frequency), treatment time (treatment from micro second order to about 1 hour) and gas concentration (in case of low pressure, the degree of reduced pressure is for example, 10 to 150 Pa).

For example, when oxygen is used, the effect of physical surface improvement by ion etching and chemical surface improvement by radical implantation (the introduction of an oxygen atom) are expected. In addition, chemical surface improvement can be carried out only by radical implantation. In this case, there can be used a pulse modulation type device (treatment is repeated while adjusting the time of ON/OFF of plasma), a remote type device in which a chamber for generating plasma and a chamber for carrying out treatment are different, or a down flow type device can be used.

Further, when a mixed gas of methane and air is used, a carbon deposition film containing nitrogen is formed on the surface of a substrate and when tetramethoxysilane and oxygen are used, a orderly and hardly silicate film is formed on the surface of a substrate. Thereby, highly hydrophilic surface coating superior in durability can be formed.

The surface prepared by these methods is superior in the wettability and/or deposit resistance, also superior in the durability of properties and can be preferably used as an ocular lens material.

Further, the effective improvement of the wettability and/or deposit resistance can be achieved by forming the coating of the hydrophilic polymer on the surface of the substrate of an ocular lens.

Procedures known to those skilled in the art are applied as a method of forming the coating of the hydrophilic polymer. For example, a method of surface improvement by the plasma polymerized coating by carrying out glow discharge (plasma) under atmosphere of the gasified hydrophilic monomer. In this case, the fragment of a monomer and active species are randomly re-combined with the substrate, additionally, the polymerization of the monomer by generated radicals occurs also, thereby a polymer coating which was highly and randomly crosslinked can be formed on the surface of the substrate.

The plasma polymerization is carried out, for example, under the conditions below.

Flow rate of plasma gas (argon, nitrogen and the like: 1 to 50 sccm)

Flow rate of monomer gas (1 to 50 sccm)

Glow discharge (frequency; 13.56 MHz, output power; 30 to 100 W, pressure; 1.0 to 30 Pa)

The hydrophilic monomer used here is not specifically limited so far as a compound can be gasified at low pressure and under heating. Particularly, pyrrolidone derivatives such as a 1-alkyl-3-methylene-2-pyrrolidone; vinyl lactams such as N-VP, acrylamides such as N,N-dimethylacrylamide (herein after, referred to as DMAA), (math)acrylic acid, hydroxyalkyl (meth)acrylate and the like are mentioned.

Further, there can be used a method plasma-induced in which the plasma treatment is carried out under gas atmosphere such as oxygen, nitrogen and argon to generate radicals on the surface of the substrate, then the ocular lens material is immersed in a solution of the hydrophilic monomer, and the polymer coating is formed by being cured by irradiation of ultraviolet rays or by heating. In this case, the conditions of UV irradiation and heating for forming the polymer coating are not specifically limited. A condition by which the monomer used can be adequately cured can be selected. For example, it is effective to repeatedly carry out irradiation under UV irradiation conditions of irradiance of 0.5 to 15 mW/cm$^2$ (365 nm) for 1 to 30 minutes, if necessary.

Further, in case of heating, heating at 40 to 100° C. for 10 to 24 hours is effective. Further, the UV irradiation or heating treatment may be carried out in a state immersed in the fore-mentioned hydrophilic monomer or in a state of stirring, or after immersing, in a state in which the substrate was taken out or dried.

The hydrophilic monomer used here includes pyrrolidone derivatives such as 1-alkyl-3-methylene-2-pyrrolidone; vinyl lactams such as N-VP; acrylamides such as DMAA; (meth) acrylic acid, hydroxyalkyl methacrylate; zwitter ion containing compounds such as 2-methacrlyloyloxyethylphosphorylcholine (MPC) and N-(3-sulfopropyl) methacrlyloyloxyethyl-N,N-dimethylammonium betaine (SPE); and a mixture thereof. In this case, since the monomer is graft-polymerized using the radical of the substrate as an initiating point, it is preferable for forming an effective coating with superior durability that a crosslinking agent exists in mixture in a monomer solution. The crosslinking agent includes ethylene glycol dimethacrylate (EDMA), polyethylene glycol di(meth)acrylate, allyl methacrylate (AMA), diethylene glycol diallyl ether and the like. However, the crosslinking agent which can be used is not also specifically limited. The crosslinking agent can be appropriately selected depending on the monomer used and a solvent. Further, the solvent used is not specifically limited, and water-soluble solvents such as water, methanol, ethanol, 2-propanol, acetone, acetonitrile and THF are mentioned. Among these, water which can be used for hydration treatment as it is most preferable considering as an ocular lens.

When the molded article (copolymer) obtained is essentially a water-containing material, the desired shape of the ocular lens material is obtained by immersing the molded article which was formed as an ocular lens shape by cutting process or the molded article of the shape of the ocular lens material which was taken out from a mold, in distilled water or a saline solution, and the polymerizable components which are not reacted, an organic diluent and the like can be simultaneously removed. In order to effectively remove the fore-mentioned compounds capable of being eluted, distilled water or a saline solution may be heated at the same time with hydration of the lens or after hydration. The heating temperature is preferably a temperature at which a residual article can be removed in a short time and less than the deformation temperature of the ocular lens material, and is preferably, for example, 35 to 100° C.

The colorless and transparent lens after the elution treatment can be also colored using a vat dye. The vat dyes used are dyes such as an indanthron type, a pyranthrone type, a benzanthorone type, an anthraquinonecarbazole type, an anthraquinoneoxazole type and an indigo type. Preferable examples include C.I.VAT BLUE 4, C.I.VAT BLUE 6 and C.I.VAT BROWN 1 for the indanthron type; C.I.VAT GREEN 1 for the pyranthrone type; C.I.VAT BROWN 2 for the anthraquinonecarbazole type; C.I.VAT BLUE 1 for the indigo type, etc.

The dyeing steps of these vat dyes include steps below.
1) A water-insoluble vat dye is dispersed in water.
2) A dye is reduced to be a water-soluble leuco dye.
3) A leuco dye is adsorbed on a substrate.
4) A dye is oxidized on a substrate and returned to be an original water-insoluble dye.
5) A reduction solution and an excessive dye are rinsed and removed.

The reduction condition of the vat dye is important because it greatly influences its dyeing properties. It is usually influenced by the concentration of alkali, the concentration of a reducing agent, and the temperature of reduction and dyeing. Further, the solubility of the leuco compound, affinity to a substrate and the like affect also greatly dyeing properties. As the reduction condition, the concentration of sodium hydroxide is 0.0050 to 5.0 mol/L, the concentration of sodium hydrosulfite being a reducing agent is 0.001 to 50 g/L, the temperature of reduction is room temperature to 80° C., and its dyeing temperature is also preferably room temperature to 80° C. Further, the concentration of dyeing is preferably 0.0001 to 1.0 g/L. The immersion time is correlative to the concentration of dyeing but the shading of the dyeing can be generally controlled by immersion for 30 seconds to 1 hour.

Further, there is also possible dyeing by a soluble vat dye which was obtained by preliminarily leuco sulfate esterifying of a water-insoluble vat dye. Examples include C.I. solubilised VAT BLUE 6 for the fore-mentioned indanthron type; C.I. solubilised VAT GREEN 1 for the pyranthrone type; C.I. solubilised VAT BLUE 1 for the indigo type and the like. When the soluble vat dye is used, it can be directly mixed in the original monomer mixture of the ocular lens material to be used.

Since the ocular lens material of the present invention thus obtained is excellent in surface wettability and the lubricity/easy lubricating property of surface in addition to high oxygen permeability and high mechanical strength, it can be preferably used for, for example, a contact lens, an intraocular lens, an artificial cornea, cornea onlay, cornea inlay and the like.

Then, the ocular lens material of the present invention is further illustrated in detail based on Examples, but the present invention is not limited to only such Examples.

(Preparation of Macromonomer (A1))

In a 1 L three necked flask equipped with a Dimroth condenser, a mechanical stirrer and a thermometer at side tubes which was preliminarily replaced with nitrogen, 75.48 g (0.34 mol) of isophorone diisocyanate (IPDI) and 0.12 g of iron acetylacetonate (FeAA) was added. Then, 529.90 g of polydimethylsiloxane with hydroxyl groups at both terminals (KF-6002, manufactured by Shin-Etsu Chemical Co. Ltd.; a degree of polymerization of 40, having a mean molecular weight of 1560 g/mol, hereinafter, referred to as DHDMSi40) was added thereto to be stirred for about 4 hours in an oil bath which was heated at 80° C.

Then, 39.47 g (0.34 mol) of 2-hydroxyethyl acrylate (HEA) and 0.20 g of p-methoxyphenol (MEHQ) as a polymerization inhibitor were added in the three necked flask to be stirred in an oil bath at 80° C. After about 3 hours, the confirmation of the reaction was carried out from the reaction solution using $^1$H-NMR and FT/IR and it was confirmed that a prescribed compound was obtained. Further, the crude compound was extracted and rinsed with n-hexane and acetonitrile, the n-hexane phase was collected and the organic solvent and low molecular weight compounds were distilled off to obtain 522.33 g (yield; 81%) of a purified compound.

NMR; (in CDCl$_3$); δ0.06 ppm (Si—CH$_3$, m), 0.52 (Si—CH$_2$,2H, m), 2.91 (NH—CH$_2$,2H, d), 3.02 (CH$_2$—N=C=O, 2H, s), 3.42 (—O—CH$_2$,2H, t), 3.61 (—O—CH$_2$, 2H, m), 4.18-4.34 (—(O)CO—CH$_2$—,6H, m), 4.54 (NH, 1H, s), 4.85 (NH, 1H, s), 5.84 (CH=, 1H, dd), 6.14 (CH=, 1H, dd), 6.43 (CH=, 1H, dd)

FT/IR; 1262 and 802 cm$^{-1}$ (Si—CH$_3$), 1094 and 1023 cm$^{-1}$ (Si—O—Si), 1632 (C=C) and nearby 1728 cm$^{-1}$ (C=O, ester and urethane).

(Preparation of Macromonomer (A2))

In a 1 L three necked flask equipped with a Dimroth condenser, a mechanical stirrer and a thermometer at side tubes which was preliminarily replaced with nitrogen, 44.60 g (0.20 mol) of isophorone diisocyanate (IPDI) and 0.07 g of iron acetylacetonate (FeAcAc) was added. Then, 90.80 g of dimethylsiloxane with hydroxyl groups at both terminals (KF-6001, manufactured by Shin-Etsu Chemical Co. Ltd.; a degree of polymerization of 10, having a mean molecular of 1000 g/mol, hereinafter, referred to as DHDMSi10) was added thereto to be stirred for about 4 hours in an oil bath which was heated at 80° C.

Then, a solution in which 0.07 g of iron acetylacetonate (FeAA) and 156.80 g of polyethylene glycol (having a mean molecular weight of 1020 g/mol, manufactured by Aldrich Corporation) was dissolved in 200 mL of chloroform were added thereto to be refluxed for about 4 hours. The portion of the reaction solution was taken out, the solvent was distilled off under reduced pressure, and then the hydroxyl value of the intermediate obtained was measured (acetylation method, 4210 g/mol).

In a 500 mL three necked flask in which 106.50 g of the fore-mentioned intermediate was separately batched off, 7.90 g (0.05 mol) of 2-isocyanatoethyl methacrylate (IEM) was added. As a polymerization inhibitor, 0.05 g of p-methoxyphenol (MEHQ) was added in the three necked flask to be stirred in an oil bath at 80° C. After about 3 hours, the confirmation of the reaction was carried out from the reaction solution using $^1$H-NMR and FT/IR and it was confirmed that a urethane compound was obtained. Further, the crude compound was extracted and rinsed with n-hexane and methanol, the n-hexane phase was collected and the organic solvent and low molecular weight compounds were distilled off to obtain 84.56 g (yield; 74%) of a purified compound.

NMR; (in CDCl$_3$); δ 0.06 ppm (Si—CH$_3$, m), 0.52 (Si—CH$_2$,2H, m), 2.91 (NH—CH$_2$, 2H, d), 3.02 (CH$_2$—N=C=O, 2H, s), nearby 3.5 (—O—CH$_2$, m), 4.18-4.34 (—(O)CO—CH$_2$—,6H, m), 4.54 (NH, 1H, s), 4.85 (NH, 1H, s), 5.84 (CH=, 1H, dd), 6.14 (CH=, 1H, dd), 6.43 (CH=, 1H, dd)

FT/IR; 1262 and 802 cm$^{-1}$ (Si—CH$_3$), 1094 and 1023 cm$^{-1}$ (Si—O—Si), 1632 (C=C) and nearby 1728 cm$^{-1}$ (C=O, ester and urethane).

Abbreviations below are used in Examples.
TRIS: Tris(trimethylsiloxy)silylpropyl methacrylate
DMAA: N,N-dimethylacrylamide
1,3-MMP: 1-Methyl-3-methylene-2-pyrrolidone
1,5-MMP: 1-Methyl-5-methylene-2-pyrrolidone
5,3-MMP: 5-Methyl-3-methylene-2-pyrrolidone
NiPMP: 1-i-Propyl-3-methylene-2-pyrrolidone
N-VP: N-vinyl-2-pyrrolidone
MMA: Methyl methacrylate
EDMA: Ethylene glycol dimethacrylate
NMP: 1-Methyl-2-pyrrolidone
TPO: 2,4,6-Trimethylbenzoyl-diphenylphosphine oxide
HMPPO: 2-Hydroxy-2-methyl-propiophenone
BAPO: Bis(2,4,6-trimethylbenzoyl)-phenylphosphine oxide
ADMVN: 2,2'-Azobis(2,4-dimethylvaleronitrile)
CBDMP: 2-(5-Chloro-2H-benzotriazol-2-yl)-6-(1,1-dimethylethyl)-4-methylphenol
HPT: 2-(4,6-Diphenyl-1,3,5-triazin-2-yl)-5-(hexyloxy)phenol
BZT-MA: 2-(2'-Hydroxy-5'-(2''-methacryloyloxyethoxy)-3'-t-butylphenyl)-5-methyl-2H-benzotriazole
APMA: Tetra-(4-methacrylamide)copper phthalocyanine
PAMNp: 1-Phenylazo-3-methacryloyloxy-2-naphthole Further, the amounts (parts in weight) of a crosslinking agent, a polymerization initiator, an ultraviolet absorbent, a colorant and a diluent in Table are amounts based on 100 parts of the polymerizable components other than these.

The determination of residual monomers in the contact lens polymer obtained in Examples, the determination of eluted articles in a processing solution after hydration treatment, the transparency of the contact lens, the lubricity of surface, wettability, a contact angle, stress relaxation, a tensile modulus, oxygen permeability, a refractive index, a water content and lipid deposition were studied according to methods below.

(Determination of Residual Monomers (HPLC))

After polymerization, a lens taken out from a mold was immersed in acetonitrile and the extraction of residual components was carried out. The extract was analyzed with HPLC, and the residual rates of monomers based on mixed amounts were calculated with respect to 1,3-MMP, 1,5-MMP, 5,3-MMP and N-VP whose residual amounts are comparatively much. At the determination of the residual rates, the acetonitrile solutions of 1,3-MMP, 1,5-MMP, 5,3-MMP and N-VP were prepared and analyzed with HPLC. According to the analytical results, the concentrations (ppm) of respective monomers were set as an X-axis and the analytical values of respective peak areas were set as a Y-axis to prepare calibration curves. The residual rates S1(%) for the amount of a pyrrolidone monomer used and the residual rates S2(%) for the total amount of a lens are shown as follow using V: the amount of an extraction solvent (mL), A: the peak area of a monomer, a; the gradient of a calibration curve, b: the intercept of a calibration curve, W: the weight (g) of a plate and w: the weight proportion (%) of an objective monomer at mixing.

$$S1(\%)=\{V \times (A-b)\}/(a \times W \times w \times 100)$$

$$S2(\%)=\{V \times (A-b)/(a \times W \times 10000)$$

(TOC Analysis)

Lens materials of Example 1 and Comparative Example 1 just after polymerization were used as samples. After the weight of these samples were measured, the sample was charged one by one in a vial container in which 20 mL of ultra pure water was charged and autoclave was carried out at 121° C. for 10 minutes. 5 Samples were prepared per the same material, lenses were taken out just after cooling (0 day), the first day, the third day, 8$^{th}$ day and 14$^{th}$ day after autoclaving, and the analysis of the processing solutions was carried out by TOC. The measurement was carried out using a total organic carbon meter (TOC) (TOC-V$_{CSH}$) manufactured by Shimadzu Corporation and carried out with NPOC (Non Purgeable Organic Carbon) mode. The results are shown in Table 4. The determination values (ppmC) in the table show the concentrations of an extract when the concentration just after (0 day) the autoclave treatment was referred to as zero. Namely, a large value indicates that the elution amount is much.

(Transparency)

The appearance of a contact lens is visually observed and evaluated based on the following criteria.

Evaluation Criteria

A: Clouding is not observed at all, transparency is extremely superior and it is most suitable as a contact lens.

B: Clouding is slightly observed and it has transparency which is out of problem as a contact lens.

C: Since opaque is confirmed and transparency is inferior, it is difficult to be used as a contact lens.

D: Since opaque is confirmed and transparency is extremely inferior, it is impossible to be used as a contact lens.

(Surface Lubricity and Wettability)

A contact lens was folded into two and rubbed between fingers to examine lubricity (adhesion state of the lens with itself and adhesion state of the lens and the finger). Further, the wettability of lens surface was visually confirmed.

Evaluation Criteria

A: The wettability is good, the lubricity of mutual lenses is good and it is most suitable as a contact lens.

B: The wettability is slightly deficient and when mutual lenses are rubbed, creak is slightly felt.

C: There is no adhesiveness of a lens with fingers but the slip of mutual lenses is bad and movement is not occasionally observed.

D: Stickiness is observed on lens surface and the adhesion feeling of a lens with fingers is strong.

(Contact Angle (Bubble Method))

A contact angle (°) (a bubble method) was measured in a saline solution at a temperature of 25° C. using a contact anglemeter G-I, 2MG manufactured by Erma Sales Co., LTD. 10 μL of bubbles were applied to the film immersed in the saline solution by using a syringe, and the contact angles between the foams and the left and right of a plate were averaged to be referred to as the value of a contact angle. The smaller the value of a contact angle is, the better the wettability is.

(Stress Relaxation)

The periphery of an ocular lens material is fixed and its center was fixed on a loading device with a ⅟₁₆ inch ball pointed jig. A load of about 20 g was added on the ocular lens material and stopped, stress (So (g/mm$^2$)) was measured just after the stoppage, it was further left alone for 30 seconds, then its stress (S (g/mm$^2$)) was measured. The stress relaxation (%) was calculated in accordance with following equation using So and S measured.

Further, when the Stress relaxation (%)={(So−S)/So}×100 is at least 15%, the ocular lens material is lacking in stress relaxation and inferior in the rigidity to keep its lens shape and it cannot be said that it has flexibility suitable as the ocular lens material.

$$\text{Stress relaxation (\%)} = \{(So-S)/So\} \times 100$$

(Tensile Modulus)

Sample having a dumbbell shape of a stretched portion with a width of 2 mm and a thickness of 0.3 mm were punched out and tensile tests were carried out by using an INSTRON universal material tester Mode 14300. The measurement was carried out in a saline solution at 35° C. and Young's modulus was calculated from a stress-elongation curve. Further, when the Young's modulus is larger than 0.8 MPa, the elasticity of the ocular lens material is high and there is high possibility to cause the fixation of a lens at wearing the lens and affections such as cornea staining.

(Oxygen Permeability Coefficient Dk)

The oxygen permeability coefficients of test pieces were measured in a saline solution at 35° C. by using Seikaken-type film oxygen-gas permeator manufactured by RIKASEIKI KOGYO Co., LTD. The measurement of either of test pieces with a thickness of 0.1 to 0.4 mm was carried out in accordance with ISO 9913-1 using a cigarette paper. Calculation considering edge effect was carried out and the Dk value was standardized as 64 using MENICON EX (manufactured by Menicon Co.) as a reference standard. Further, the unit of the oxygen permeability coefficient is ($\times 10^{-11}$ (cm$^2$/sec)) (mLO$_2$/mL×hPa) and this is a value obtained by multiplying the unit ($\times 10^{-11}$ (cm$^2$/sec)) (mLO$_2$/mL×mmHg) which has been conventionally used in the skilled in the art, by 0.75.

(Refractive Index)

Refractive index (no unit) was measured at a temperature of 25° C. under atmosphere with a humidity of 50% using an ATAGO Refractometer 1T manufactured by ATAGO CO., LTD.

(Water Content)

After hydration treatment was carried out to a test piece, the water content of the test piece was measured in accordance with the following equation. Provided that W represents the weight (g) of the test piece in equilibrated swollen state after the hydration treatment and $W_0$ represents the weight (g) of the test piece in state in which it was dried at 105° C. in a dryer for 16 hours after the hydration treatment.

$$\text{Water content (\% by weight)} = (W - W_0) \times 100/W$$

(Lipid Deposition Test)

After a lens was immersed at 37° C. for 5 hours in an artificial tear lipid solution consisting of oleic acid, tripalmitic acid, palmitic acid, cholesterol, cholesterol palmitate and yolk lecithin, it was extracted with ethanol and diethyl ether, and an lipid deposition (mg/cm$^2$) was determined by a SPV method.

Examples 1 to 3 and Comparative Example 1

Ocular Lens components mixed with the polymerizable components and polymerization initiator shown in Table 1 were injected into a mold (made of a polypropylene; corresponding to a contact lens with a diameter of about 13 mm and a thickness of 0.1 mm) having a contact lens shape. Then, photo polymerization was carried out by irradiating UV light on the mold for 60 minutes to obtain polymers having a contact lens shape. The results evaluating the amounts of unreacted residual monomers in the polymer were shown in Tables 2 and 3 and the evaluation results of the concentration of eluted articles in the processing solution by TOC after hydration were shown in Table 4.

TABLE 1

| Monomer mixing ratio (parts by weight) | | | | |
|---|---|---|---|---|
| | Ex. | | | Com. Ex. |
| | 1 | 2 | 3 | 1 |
| TRIS | 27 | 27 | 27 | 27 |
| Macromonomer A1 | 23 | 23 | 23 | 23 |
| DMAA | 10 | 10 | 10 | 10 |
| N-VP | — | — | — | 40 |
| 1,3-MMP | 40 | — | — | — |
| 1,5-MMP | — | 40 | — | — |
| 5,3-MMP | — | — | 40 | — |
| EDMA | 0.4 | 0.4 | 0.4 | 0.4 |
| HMPPO | 0.4 | 0.4 | 0.4 | 0.4 |

TABLE 2

Monomer residual rate (based on monomer)

| Residual rate S1 (%) | Ex. 1 | Ex. 2 | Ex. 3 | Com. Ex. 1 |
|---|---|---|---|---|
| N-VP | — | — | — | 2.6 |
| 1,3-MMP | 0.5 | — | — | — |
| 1,5-MMP | — | 0.9 | — | — |
| 5,3-MMP | — | — | 0.4 | — |

TABLE 3

Monomer residual rate (based on total weight)

| Residual rate S2 (%) | Ex. 1 | Ex. 2 | Ex. 3 | Com. Ex. 1 |
|---|---|---|---|---|
| N-VP | — | — | — | 1.0 |
| 1,3-MMP | 0.2 | — | — | — |
| 1,5-MMP | — | 0.3 | — | — |
| 5,3-MMP | — | — | 0.1 | — |

TABLE 4

TOC aging change

| Quantity value (ppm) | 1st day | 3rd day | 8th day | 14th day |
|---|---|---|---|---|
| Ex. 1 (1,3-MMP) | 0.9 | 2.2 | 1.9 | 4.8 |
| Com. Ex. 1 (N-VP) | 5.9 | 5.9 | 8.9 | 11.8 |

Examples 4 to 31 and Comparative Examples 2 to 5

Ocular Lens components mixed with the polymerizable components, polymerization initiator, UV absorbent, Dye and a diluent shown in Tables 5 to 9 were injected into a mold (made of a polypropylene) having a contact lens shape. Then, photopolymerization was carried out by irradiating UV light on the mold for 30 minutes to obtain polymers having a contact lens shape. Plasma irradiation (an RF output power of 50 W and a pressure of 100 Pa) under oxygen atmosphere was carried out on the polymers obtained, for 3 minutes. They were immersed in a saline solution and hydration treatment was carried out by absorbing water to obtain contact lenses. The evaluation results were shown in Tables 10 to 14.

TABLE 5

Monomer mixing ratio (parts by weight)

| | Ex. 4 | Ex. 5 | Ex. 6 | Ex. 7 | Ex. 8 | Ex. 9 | Ex. 10 |
|---|---|---|---|---|---|---|---|
| TRIS | 30 | 30 | 30 | 30 | 27.5 | 22 | 22 |
| Macromonomer A1 | 30 | 30 | 30 | 30 | 27.5 | 33 | 33 |
| DMAA | 10 | 10 | 10 | 10 | 11.3 | 11.3 | 11.3 |
| N-VP | — | — | — | — | — | — | — |
| 1,3-MMP | 30 | 30 | — | — | 33.7 | 33.7 | 33.7 |
| 1,5-MMP | — | — | 30 | — | — | — | — |
| 5,3-MMP | — | — | — | 30 | — | — | — |
| EDMA | 0.4 | 0.4 | 0.4 | 0.4 | 0.4 | 0.4 | 0.4 |
| HMPPO | 0.4 | 0.4 | 0.4 | 0.4 | 0.4 | 0.4 | 0.4 |
| Dye | APMA 0.01 | None | APMA 0.01 | APMA 0.01 | APMA 0.01 | PAMNp 0.01 | None |

TABLE 6

Monomer mixing ratio (parts by weight)

| | Ex. 11 | Ex. 12 | Ex. 13 | Ex. 14 | Ex. 15 | Ex. 16 | Ex. 17 |
|---|---|---|---|---|---|---|---|
| TRIS | 22 | 22 | 30 | 30 | 30 | 30 | 25 |
| Macromonomer A1 | 33 | 33 | 20 | 20 | 20 | 20 | 25 |
| DMAA | 11.3 | 11.3 | 12.5 | 12.5 | 12.5 | 12.5 | 12.5 |
| N-VP | — | — | — | — | — | — | — |
| 1,3-MMP | — | — | 37.5 | 37.5 | — | — | 37.5 |
| 1,5-MMP | 33.7 | — | — | — | 37.5 | — | — |
| 5,3-MMP | — | 33.7 | — | — | — | 37.5 | — |
| EDMA | 0.4 | 0.4 | 0.4 | 0.4 | 0.4 | 0.4 | 0.4 |
| HMPPO | 0.4 | 0.4 | 0.4 | 0.4 | 0.4 | 0.4 | 0.4 |
| Dye | PAMNp 0.01 | PAMNp 0.01 | APMA 0.01 | None | APMA 0.01 | APMA 0.01 | APMA 0.01 |

TABLE 7

| | Monomer mixing ratio (parts by weight) | | | |
|---|---|---|---|---|
| | Com. Ex. | | | |
| | 2 | 3 | 4 | 5 |
| TRIS | 25 | 37.5 | 50 | 40 |
| Macromonomer A1 | 25 | 12.5 | — | — |
| DMAA | 12.5 | 10 | 12.5 | 12.5 |
| N-VP | 37.5 | 40 | — | — |
| 1,3-MMP | — | — | 37.5 | 37.5 |
| 1,5-MMP | — | — | — | — |
| 5,3-MMP | — | — | — | — |
| MMA | — | — | — | 10 |
| EDMA | 0.4 | 0.4 | 0.4 | 0.4 |
| HMPPO | 0.4 | 0.4 | 0.4 | 0.4 |
| Dye (APMA) | 0.01 | 0.01 | 0.01 | 0.01 |

TABLE 8

| | Monomer mixing ratio (parts by weight) | | | | | | | |
|---|---|---|---|---|---|---|---|---|
| | Ex. | | | | | | | |
| | 18 | 19 | 20 | 21 | 22 | 23 | 24 | 25 |
| TRS | 30 | 27.5 | 22 | 22 | 30 | 25 | 30 | 25 |
| Macromonomer | A1 | A1 | A1 | A1 | A1 | A1 | A2 | A2 |
| | 30 | 27.5 | 33 | 33 | 20 | 20 | 30 | 25 |
| DMAA | 10 | 11.3 | 11.3 | 11.3 | 12.5 | 13.8 | 10 | 12.5 |
| N-VP | — | — | — | — | — | — | — | — |
| 1,3-MMP | 30 | 33.7 | 33.7 | 33.7 | 37.5 | 41.2 | 30 | 37.5 |
| EDMA | 0.4 | 0.4 | 0.4 | 0.4 | 0.4 | 0.4 | 0.4 | 0.4 |
| Photopolymerization initiator | TPO | TPO | HMPPO | HMPPO | BAPO | BAPO | HMPPO | HMPPO |
| | 0.4 | 0.4 | 0.4 | 0.4 | 0.4 | 0.4 | 0.4 | 0.4 |
| UV absorbent | CBDMP | HPT | BZT-MA | BZT-MA | CBDMP | HPT | None | None |
| | 0.2 | 0.2 | 0.5 | 0.5 | 0.2 | 0.2 | | |
| APMA | 0.01 | 0.01 | None | 0.01 | 0.01 | 0.01 | 0.01 | 0.01 |

TABLE 9

| | Monomer mixing ratio (parts by weight) | | | | | |
|---|---|---|---|---|---|---|
| | Ex. | | | | | |
| | 26 | 27 | 28 | 29 | 30 | 31 |
| TRIS | 30 | 25 | 30 | 22 | 22 | 30 |
| Macromonomer A1 | 30 | 25 | 30 | 33 | 33 | 30 |
| DMAA | 10 | 12.5 | 10 | 11.3 | 11.3 | 10 |
| 1,3-MMP | — | — | 30 | — | — | — |
| 1,5-MMP | — | — | — | 33.7 | — | — |
| 5,3-MMP | — | — | — | — | 33.7 | — |
| NiPMP | 30 | 37.5 | — | — | — | 30 |
| EDMA | 0.4 | 0.4 | 0.4 | 0.4 | 0.4 | 0.4 |
| HMPPO | 0.4 | 0.4 | 0.4 | 0.4 | 0.4 | 0.4 |
| APMA | 0.01 | 0.01 | 0.01 | 0.01 | 0.01 | 0.01 |
| Diluent | — | — | NMP | Ethanol | Ethanol | Ethanol |
| | | | 2.5 | 2.5 | 2.5 | 2.5 |

TABLE 10

| | Evaluation results of physical and chemical properties | | | | | | |
|---|---|---|---|---|---|---|---|
| | Ex. | | | | | | |
| | 4 | 5 | 6 | 7 | 8 | 9 | 10 |
| Transparency | A | A | A | A | A | A | A |
| Surface lubricity and wettability | B | B | B | B | A | A | A |
| Contact angle (°) | 28 | 29 | 29 | 26 | 27 | 26 | 26 |
| Stress relaxation (%) | 13 | 13 | 13 | 13 | 13 | 12 | 12 |
| Tensile modulus (MPa) | 0.28 | 0.30 | 0.28 | 0.32 | 0.25 | 0.39 | 0.37 |

TABLE 10-continued

Evaluation results of physical and chemical properties

| | Ex. | | | | | | |
|---|---|---|---|---|---|---|---|
| | 4 | 5 | 6 | 7 | 8 | 9 | 10 |
| Dk | 78 | 88 | 88 | 92 | 69 | 90 | 90 |
| Water content (%) | 34 | 34 | 30 | 35 | 40 | 40 | 40 |
| Refractive index | 1.426 | 1.426 | 1.433 | 1.424 | 1.420 | 1.420 | 1.420 |
| Residual rate S1 (%) MMP | 1.4 | — | — | — | 1.5 | 0.4 | 0.5 |

TABLE 11

Evaluation results of physical and chemical properties

| | Ex. | | | | | | |
|---|---|---|---|---|---|---|---|
| | 11 | 12 | 13 | 14 | 15 | 16 | 17 |
| Transparency | A | A | A | A | A | A | A |
| Surface lubricity and wettability | A | A | A | A | A | A | A |
| Contact angle (°) | 26 | 25 | 27 | 27 | 28 | 26 | 22 |
| Stress relaxation (%) | 12 | 13 | 10 | 10 | 11 | 12 | 13 |
| Tensile modulus (MPa) | 0.36 | 0.40 | 0.37 | 0.40 | 0.36 | 0.40 | 0.23 |
| Dk | 79 | 83 | 66 | 78 | 74 | 75 | 53 |
| Water content (%) | 35 | 43 | 45 | 45 | 42 | 47 | 47 |
| Refractive index | 1.424 | 1.419 | 1.421 | 1.421 | 1.421 | 1.414 | 1.412 |
| Residual rate S1 (%) MMP | 0.9 | 0.4 | 2.1 | 1.9 | 2.2 | 1.2 | 2.3 |

TABLE 12

Evaluation results of physical and chemical properties

| | Com. Ex. | | | |
|---|---|---|---|---|
| | 2 | 3 | 4 | 5 |
| Transparency | A | A | C | B |
| Surface lubricity and wettability | A | A | B | B |
| Contact angle (°) | 22 | 23 | 28 | 27 |
| Stress relaxation (%) | 10 | 16 | Incapable measurement* | 37 |
| Tensile modulus (MPa) | 0.47 | 0.22 | Incapable measurement* | 0.56 |

TABLE 12-continued

Evaluation results of physical and chemical properties

| | Com. Ex. | | | |
|---|---|---|---|---|
| | 2 | 3 | 4 | 5 |
| Dk | 79 | 50 | Incapable measurement* | 31 |
| Water content (%) | 45 | 54 | 60 | 54 |
| Refractive index | 1.414 | 1.400 | Incapable measurement* | 1.404 |
| Residual rate S1 (%) M-VP | 4.0 | 4.0 | — | — |

*Incapable measurement: Because of lack in the rigidity to keep its lens shape (deformation) and poor mechanical strength.

TABLE 13

Evaluation results of physical and chemical properties

| | Ex. | | | | | | | |
|---|---|---|---|---|---|---|---|---|
| | 18 | 19 | 20 | 21 | 22 | 23 | 24 | 25 |
| Transparency | A | A | A | A | A | A | A | A |
| Surface lubricity and wettability | A | B | A | A | A | A | A | A |
| Contact angle (°) | 27 | 27 | 26 | 26 | 28 | 25 | 26 | 22 |
| Stress relaxation (%) | 13 | 12 | 13 | 13 | 12 | 12 | 13 | 13 |
| Tensile modulus (MPa) | 0.29 | 0.46 | 0.43 | 0.38 | 0.31 | 0.30 | 0.26 | 0.23 |
| Dk | 74 | 71 | 87 | 86 | 66 | 58 | 70 | 51 |
| Water content (%) | 34 | 33 | 39 | 40 | 40 | 51 | 36 | 48 |
| Refractive index | 1.426 | 1.427 | 1.420 | 1.420 | 1.420 | 1.407 | 1.424 | 1.412 |
| Residual rate S1 (%) MMP | 1.5 | 1.8 | 0.9 | 1.1 | 2.4 | 2.8 | 2.3 | 2.5 |

TABLE 14

Evaluation results of physical and chemical properties

| | Ex. | | | | | |
|---|---|---|---|---|---|---|
| | 26 | 27 | 28 | 29 | 30 | 31 |
| Transparency | A | A | A | A | A | A |
| Surface lubricity and wettability | A | B | A | A | A | A |
| Contact angle (°) | 28 | 28 | 26 | 28 | 28 | 25 |
| Stress relaxation (%) | 13 | 13 | 12 | 12 | 13 | 12 |
| Tensile modulus (MPa) | 0.31 | 0.27 | 0.28 | 0.36 | 0.40 | 0.26 |
| Dk | 74 | 52 | 76 | 75 | 80 | 74 |
| Water content (%) | 32 | 41 | 35 | 35 | 42 | 32 |
| Refractive index | 1.428 | 1.420 | 1.425 | 1.424 | 1.420 | 1.428 |
| Residual rate S1 (%) MMP | 1.6 | 2.4 | 0.5 | 0.7 | 0.2 | 0.8 |

Examples 32 and 33

After plasma irradiation (an output power of 50 W and a pressure of 100 Pa, for 3 minutes) under oxygen atmosphere was carried out for polymers before hydration which were obtained by using the similar mixed solutions as Examples 1 and 11, they were immersed in an aqueous solution (5.0% by weight of diethylene glycol diallyl ether was contained) of 5.0% by mol of N-VP and graft polymer films were formed by heating at 60° C. for 30 minutes. Hydration treatment was carried out to obtain contact lenses. The evaluation results were shown in Table 15.

Examples 34 and 35

After plasma irradiation (an output power of 50 W and a pressure of 100 Pa, for 3 minutes) under oxygen atmosphere was carried out for polymers before hydration which were obtained by using the similar mixed solutions as Examples 1 and 11, they were immersed in an aqueous solution (5.0% by weight of tetraethylene glycol dimethacrylate was contained) of 1.0% by mol of MPC (2-methacrylolyloxyethylphosphoryl choline) and graft polymer films were formed by UV irradiation for 10 minutes. Hydration treatment was carried out to obtain contact lenses. The evaluation results were shown in Table 15.

Examples 36 and 37

Glow discharge (a pressure of 13 Pa and an RF output power of 40 W, for 5 minutes×twice) under tetramethoxysilane (TMS)/oxygen (a gas flow ratio of 1/2 sccm) atmosphere was carried out for polymers before hydration which were obtained by using the similar mixed solutions as Examples 1 and 11, and plasma polymerized films were formed. Hydration treatment was carried out to obtain contact lenses. The evaluation results were shown in Table 15.

Examples 38 and 39

Glow discharge (a pressure of 4 Pa and an AF output power of 40 W, for 5 minutes×twice) under methane (CH4)/air (a gas flow ratio of 3/2 sccm) atmosphere was carried out for polymers before hydration which were obtained by using the similar mixed solutions as Examples 1 and 11, and carbon deposited films were formed. Further, usual oxygen plasma and hydration treatment were carried out to obtain contact lenses. The evaluation results were shown in Table 15.

TABLE 15

Evaluation results of physical and chemical properties

| | Ex. | | | | | | | |
|---|---|---|---|---|---|---|---|---|
| | 32 | 33 | 34 | 35 | 36 | 37 | 38 | 39 |
| Material Example | 1 | 11 | 1 | 11 | 1 | 11 | 1 | 11 |
| Surface treatment | PVP graft | PVP graft | PMPC graft | PMPC graft | Silicate coating | Silicate coating | Carbon Deposited film | Carbon Deposited film |
| Transparency | A | A | A | A | A | A | A | A |
| Feeling test | A | A | A | A | A | A | A | A |
| Contact angle (°) | 20 | 22 | 21 | 24 | 20 | 21 | 28 | 30 |
| Lipid deposition (mg/cm$^2$) | 0.07 | 0.10 | 0.08 | 0.10 | 0.10 | 0.11 | 0.10 | 0.12 |

Examples 40 and 41

Glow discharge (a pressure of 13 Pa and an RF output power of 300 W, for 5 minutes) under tetrafluoromethane (CF4)/oxygen (a gas flow ratio of 9/1) atmosphere was carried out for polymers before hydration which were obtained by using the similar mixed solutions as Examples 1 and 11. Hydration treatment was carried out to obtain contact lenses. The evaluation results were shown in Table 16.

Example 42

After plasma irradiation (an output power of 50 W and a pressure of 100 Pa, for 3 minutes) under oxygen atmosphere was carried out for a polymer before hydration which was obtained by using the similar mixed solution as Example 1, hydration treatment was carried out to obtain contact lenses. The evaluation results were shown in Table 16.

Example 43

After plasma irradiation (an output power of 2.5 KW and a pressure of 133 Pa, for 3 minutes) under oxygen/water (a gas flow ratio of 9/1) atmosphere was carried out for a polymer before hydration which was obtained by using the similar mixed solution as Example 11, hydration treatment was carried out to obtain contact lenses. The evaluation results were shown in Table 16.

Example 44

Hydration treatment was carried out for a polymer before hydration which was obtained by using the similar mixed solution as Example 1, to obtain contact lenses. The evaluation results were shown in Table 16.

TABLE 16

Evaluation results of physical and chemical properties

| | Ex. | | | | |
|---|---|---|---|---|---|
| | 40 | 41 | 42 | 43 | 44 |
| Material Example | 1 | 11 | 1 | 11 | 1 |
| Surface treatment | $CF_4$ etching | $CF_4$ etching | $O_2$ plasma | $O_2 + H_2O$ (90/10) | Untreated |
| Transparency | A | A | A | A | A |
| Surface lubricity and wettability | A | A | A | A | B |
| Contact angle (°) | 25 | 26 | 28 | 28 | 36 |
| Lipid deposition ($mg/cm^2$) | 0.14 | 0.15 | 0.21 | 0.24 | 0.44 |

Preparation of Colored Lens by Vat Dyes

Examples 45 to 50

Colored lenses were obtained by the method below using vat dye for the contact lenses which were obtained by the similar procedure as Examples 1, 11 and 21.

After the contact lenses after hydration treatment were immersed in a reduction solution consisting of 0.1 g of sodium hydroxide, 0.1 g of sodium hydrosulfite and 19.8 g of purified water, about 2.0 g of a dyeing solution in which 300 ppm of each of various vat dyes shown in Table 17 was dissolved in a mixed solution with the same composition as the reduction solution was mixed with the reduction solution in which the contact lenses were preliminarily immersed, stirred for 15 minutes and adequately rinsed to obtain the contact lenses. The evaluation results were shown in Table 17.

TABLE 17

Coloring by Vat dye

| | Ex. | | | | | |
|---|---|---|---|---|---|---|
| | 45 | 46 | 47 | 48 | 49 | 50 |
| Lens Example | 1 | 1 | 11 | 11 | 21 | 21 |
| Vat blue 1 | Bluish-purple, no deformation | — | — | — | — | — |
| Vat blue 6 | — | — | Blue, no deformation | — | Blue, no deformation | — |
| Vat brown 1 | — | Pale brown, no deformation | — | — | — | — |
| Vat green 1 | — | — | — | Blue green, no deformation | — | Blue green, no deformation |

Examples 51 to 55

Ocular Lens components mixed with the polymerizable components, polymerization initiator, UV absorbent, Dye and diluent shown in Table 18 were injected into a mold (made of a polypropylene) having a contact lens shape. Then, the mold was heated in an oven adjusted at 100±2° C. for 30 minutes to obtain polymers having a contact lens shape. Plasma irradiation (an RF output power of 50 W and a pressure of 100 Pa) under oxygen atmosphere was carried out for the polymers obtained, for 3 minutes. They were immersed in a saline solution and hydration treatment was carried out by absorbing water to obtain contact lenses. The evaluation results were shown in Table 19.

TABLE 18

Monomer mixing ratio (parts by weight)

| | Ex. | | | | |
|---|---|---|---|---|---|
| | 51 | 52 | 53 | 54 | 55 |
| TRIS | 30 | 22 | 22 | 30 | 25 |
| Macro monomer A1 | 30 | 33 | 33 | 20 | 20 |
| DMAA | 10 | 11.3 | 11.3 | 16.7 | 13.8 |
| N-VP | — | — | — | — | — |
| 1,3-MMP | 30 | 33.7 | 33.7 | 33.3 | 41.2 |
| EDMA | 0.4 | 0.4 | None | None | None |
| Polymerization initiator (ADMVN) | 0.4 | 0.4 | 0.4 | 0.4 | 0.4 |
| UV absorbent (BZT-MA) | 0.3 | 0.3 | 0.3 | 0.3 | 0.3 |
| APMA | 0.01 | 0.01 | 0.01 | 0.01 | 0.01 |

TABLE 19

Evaluation results of physical and chemical properties

| | Ex. | | | | |
|---|---|---|---|---|---|
| | 51 | 52 | 53 | 54 | 55 |
| Transparency | A | A | A | A | A |
| Surface lubricity and wettability | A | A | A | A | A |
| Contact angle (°) | 28 | 26 | 26 | 26 | 25 |
| Stress relaxation (%) | 13 | 13 | 11 | 12 | 12 |
| Tensile modulus (MPa) | 0.32 | 0.44 | 0.30 | 0.32 | 0.29 |
| Dk | 77 | 67 | 67 | 67 | 60 |
| Water content (%) | 34 | 41 | 41 | 41 | 52 |
| Refractive index | 1.426 | 1.420 | 1.420 | 1.420 | 1.408 |

TABLE 19-continued

Evaluation results of physical and chemical properties

| | Ex. | | | | |
|---|---|---|---|---|---|
| | 51 | 52 | 53 | 54 | 55 |
| Residual rate S1 (%) 1,3-MMP | 0.4 | 0.6 | 0.7 | 0.6 | 0.7 |

Clinical Evaluation

Contact lenses described in Examples 4, 8, 17, 32 and 34 imparted good comfort at wearing and there were no slitlamp findings. On the other hand, although there was no slitlamp findings in wearing of contact lenses described in Comparative Example 2, it was uncomfortable. Further, in the wearing test of the contact lenses described in Comparative Example 3 which were low in repulsive property, the lens movement was poor and slow and adhesion on the cornea was confirmed.

From the above results, the contact lens materials shown in Examples 1 to 55 are excellent in transparency and low frictional property, additionally, excellent in surface wettability, excellent in flexibility and repulsive property because stress relaxation is 13% or less, further low in the residual rate of monomers, and high in safety because an elution amount to a lens preservating solution is small. Additionally, they impart also good comfort at wearing the contact lenses; therefore it is grasped that they are preferable as contact lenses.

Further, since the residual rate of the pyrrolidone derivative in lenses after polymerization is low in the material using the fore-mentioned pyrrolidone derivative and the silicone-containing macromonomer, it can be achieved to shorten the production step of an ocular lens.

On the other hand, although the materials of Comparative Examples which are not included within the claims are superior in transparency, low frictional property, flexibility and surface wettability, the residual rate of monomers is large, elution to an autoclave processing solution is also confirmed and further, adsorption is confirmed at wearing lenses; therefore they are not preferable as an ocular lens material.

Industrial Applicability

According to the present invention, a contact lens excellent in transparency, oxygen permeability, flexibility, stress relaxation, surface wettability and lubricity, little in surface sticking property, and having appropriate mechanical property, additionally, the low residual rate of monomers, low elution amount to an autoclave processing solution, high safety and good patient comfort is obtained.

Further, since the ocular lens material comprising the pyrrolidone derivatives in which the polymerizable group is a methylene group and specific silicone-containing macromonomer is excellent in polymerizability, it can be used as a highly safe ocular lens material used as an intraocular lens, an artificial cornea, or a cornea onlay and a cornea inlay which is buried in the body.

Consequently, the present invention provides not only a contact lens but also an ocular lens material having versatile uses.

Further, since the residual rate in the lens after polymerization of the pyrrolidone derivatives in which the polymerizable group is a methylene group is low in a contact lens which uses the pyrrolidone derivatives in which the polymerizable group is a methylene group and specific silicone-containing macromonomer, the present invention can achieve the simplification of the preparation process.

The invention claimed is:

1. An ocular lens material comprising at least one kind of a compound (A) having an ethylenically unsaturated group and polydimethylsiloxane structure through a urethane bond; at least one kind of a pyrrolidone derivative (B) selected from the group consisting of 1-alkyl-3-methylene-2-pyrrolidone, 1-alkyl-5-methylene-2-pyrrolidone, and 5-alkyl-3-methylene-2-pyrrolidone; silicone compound (C) being tris(trimethylsiloxy)silylpropyl(meth)acrylate; and an N-substituted acrylamide (D),
wherein an oxygen permeability coefficient (Dk) of the ocular lens material is not less than 51 ($\times 10^{-11}$ (cm$^2$/sec)), and
wherein a water content of the ocular lens material is 32% to 55% by weight.

2. An ocular lens material according to claim 1, comprising 5 to 60% by weight of the pyrrolidone derivatives.

3. An ocular lens material according to claim 1, wherein the pyrrolidone derivative (B) is 1-methyl-3-methylene-2-pyrrolidone.

4. An ocular lens material according to claim 1, wherein the pyrrolidone derivative (B) is 1-methyl-5-methylene-2-pyrrolidone.

5. An ocular lens material according to claim 1, wherein the pyrrolidone derivative (B) is 5-methyl-3-methylene-2-pyrrolidone.

6. An ocular lens material according to claim 1, wherein the repeating number of siloxane of the polydimethylsiloxane structure in a compound (A) having ethylenically unsaturated groups and polydimethylsiloxane structure through a urethane bond is 10 to 100.

7. An ocular lens material according to claim 1, wherein tensile modulus is 0.2 to 0.8 MPa and stress relaxation under loading a fixed load for 30 seconds is 8 to 15%.

8. An ocular lens material according to claim 1, wherein the N-substituted acrylamide (D) is at least one of N-substituted acrylamides selected from the group consisting of N,N-dimethyl acrylamide, N,N-diethyl acrylamide, acryloyl morpholine, N-isopropyl acrylamide and N-(2-hydroxyethyl)acrylamide.

9. An ocular lens material according to claim 1, wherein at least one of a crosslinking agent is further comprised.

10. A lens for the eyes comprising the ocular lens material according to claim 1.

11. A method for preparing an ocular lens material, comprising
a) a step of obtaining a mixed solution comprising at least one kind of a compound (A) having ethylenically unsaturated groups and polydimethylsiloxane structures through a urethane bond and at least one kind of a pyrrolidone derivative (B) selected from the group consisting of 1-alkyl-3-methylene-2-pyrrolidone, 1-alkyl-5-methylene-2-pyrrolidone, and 5-alkyl-3-methylene-2-pyrrolidone and silicone compound (C) being tris (trimethylsiloxy)silylpropyl(meth)acrylate and an N-substituted acrylamide (D), and a photo polymerization initiator and/or a thermal polymerization initiator,
b) a step of introducing said mixed solution to a mold,
c) a step of obtaining an ocular lens material cured by irradiating UV light on and/or heating the mixed solution in said mold,
d) a step of carrying out surface treatment to said ocular lens material after demolding said ocular lens material to impart hydrophilicity and deposit resistance,
e) a step of removing an unreacted component from said ocular lens material, and
f) a step of hydrating said ocular lens material,
wherein an oxygen permeability coefficient (Dk) of the ocular lens material is not less than 51 ($\times 10^{-11}$ (cm$^2$/sec)), and
wherein a water content of the ocular lens material is 32% to 55% by weight.

12. A method for preparing the ocular lens material according to claim 11, containing a crosslinking agent in the mixed solution.

13. A method for preparing the ocular lens material according to claim 11, containing at least one of polymerizable or non polymerizable ultraviolet absorbents and/or at least one of polymerizable or non polymerizable dyes in the mixed solution.

14. A method for preparing the ocular lens material according to claim 11, comprising 0.1 to 5% by weight of a water-soluble organic solvent.

15. A method for preparing the ocular lens material according to claim 14, wherein the water-soluble organic solvent is a water-soluble organic solvent selected from alcohols having 1 to 4 carbons, acetone, methyl ethyl ketone, dimethylformamide, dimethylsulfoxide, acetonitrile and N-methyl-2-pyrrolidone.

16. A method for preparing the ocular lens material according to claim 11, wherein the surface treatment is plasma treatment.

17. A method for preparing the ocular lens material according to claim 16, wherein oxygen or a mixture of oxygen is used in the plasma treatment.

18. A method for preparing the ocular lens material according to claim 17, wherein a mixture of oxygen and water is used in the plasma treatment.

19. A method for preparing the ocular lens material according to claim 17, wherein a mixture of oxygen and tetrafluoromethane is used in the plasma treatment.

20. A method for preparing the ocular lens material according to claim 17, wherein a mixture of oxygen and organic silane is used in the plasma treatment.

21. A method for preparing the ocular lens material according to claim 20, wherein the organic silane is tetramethoxysilane.

22. A method for preparing the ocular lens material according to claim 17, wherein a mixture of oxygen and methane is used in the plasma treatment.

23. A method for preparing the ocular lens material according to claim 17, wherein a mixture of oxygen, nitrogen and methane is used in the plasma treatment.

24. A method for preparing the ocular lens material according to claim 11, wherein the surface treatment is a treatment according to the coating method of a hydrophilic polymer coating.

25. A method for preparing the ocular lens material according to claim 24, wherein the coating method is a plasma polymerization method of a hydrophilic monomer.

26. A method for preparing the ocular lens material according to claim 24, wherein the coating method is a plasma-induced graft polymerization.

27. A method for preparing the ocular lens material according to claim 11, further comprising (g) a step of coloring the ocular lens material by using a vat dye.

28. A method for preparing an ocular lens material, comprising
   a) a step of obtaining a mixed solution comprising at least one kind of a compound (A) having ethylenically unsaturated groups and polydimethylsiloxane structures through a urethane bond and at least one kind of a pyrrolidone derivative (B) selected from the group consisting of 1-alkyl-3-methylene-2-pyrrolidone, 1-alkyl-5-methylene-2-pyrrolidone, and 5-alkyl-3-methylene-2-pyrrolidone and silicone compound (C) being tris(trimethylsiloxy)silylpropyl(meth)acrylate and an N-substituted acrylamide (D), and a photo polymerization initiator and/or a thermal polymerization initiator,
   b) a step of introducing said mixed solution to a mold,
   c) a step of obtaining an ocular lens material cured by irradiating UV light on and/or heating the mixed solution in said mold,
   d) a step of carrying out surface treatment to said ocular lens material after demolding said ocular lens material to impart hydrophilicity and deposit resistance, and
   e) a step of removing an unreacted component from said ocular lens material and a step of hydrating said ocular lens material, at the same time by immersing in distilled water or a saline solution,
   wherein an oxygen permeability coefficient (Dk) of the ocular lens material is not less than 51 ($\times 10^{-11}$ (cm$^2$/sec)), and
   wherein a water content of the ocular lens material is 32% to 55% by weight.

\* \* \* \* \*